US012347011B2

(12) United States Patent
McDuff et al.

(10) Patent No.: US 12,347,011 B2
(45) Date of Patent: Jul. 1, 2025

(54) GENERATING PHYSIO-REALISTIC AVATARS FOR TRAINING NON-CONTACT MODELS TO RECOVER PHYSIOLOGICAL CHARACTERISTICS

(71) Applicant: Microsoft Technology Licensing, LLC, Redmond, WA (US)

(72) Inventors: Daniel J. McDuff, Cambridge, MA (US); Javier Hernandez Rivera, Cambridge, MA (US); Tadas Baltrusaitis, Cambridge (GB); Erroll William Wood, Cambridge (GB)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 18/244,622

(22) Filed: Sep. 11, 2023

(65) Prior Publication Data

US 2023/0419581 A1 Dec. 28, 2023

Related U.S. Application Data

(63) Continuation of application No. 16/907,110, filed on Jun. 19, 2020, now Pat. No. 11,790,586.

(51) Int. Cl.
*G06T 13/40* (2011.01)
*G06N 5/04* (2023.01)
(Continued)

(52) U.S. Cl.
CPC ............. *G06T 13/40* (2013.01); *G06N 20/00* (2019.01); *G06V 20/46* (2022.01); *G06F 2218/00* (2023.01)

(58) Field of Classification Search
CPC ....... G06T 13/40; G06T 19/006; G06N 20/00; G06V 20/46; G06F 2218/00; G06F 3/011;
(Continued)

(56) References Cited

U.S. PATENT DOCUMENTS 8,038,614 B2 * 10/2011 Gobeyn ................. A61B 5/411
382/128
9,582,879 B2 * 2/2017 Cheng .................... G06T 11/60
(Continued)

FOREIGN PATENT DOCUMENTS

CN 108701370 A 10/2018
CN 110236509 A 9/2019
(Continued)

OTHER PUBLICATIONS

First Office Action Received for Chinese Application No. 202180043487.X, mailed on Mar. 29, 2025, 20 pages. (English Translation Provided).

*Primary Examiner* — Abderrahim Merouan

(57) ABSTRACT

Systems and methods are provided that are directed to generating video sequences including physio-realistic avatars. In examples, an albedo for an avatar is received, a sub-surface skin color associated with the albedo is modified based on physiological data associated with physiologic characteristic, and an avatar based on the albedo and the modified sub-surface skin color is rendered. The rendered avatar may then be synthesized in a frame of video. In some examples, a video including the synthesized avatar may be used to train a machine learning model to detect a physiological characteristic. The machine learning model may receive a plurality of video segments, where one or more of the video segments includes a synthetic physio-realistic avatar generated with the physiological characteristic. The machine learning model may be trained using the plurality of video segments. The trained model may be provided to a requesting entity.

20 Claims, 16 Drawing Sheets

(51) Int. Cl.
*G06N 20/00* (2019.01)
*G06V 20/40* (2022.01)

(58) Field of Classification Search
CPC ...... G06F 18/23; G06F 3/04815; G06F 3/016; G06F 3/167; G06F 2203/012; G06F 2203/011; G06Q 30/0643; G06Q 30/0623; G06Q 30/0631; G09B 5/02; G09B 9/00; H04L 67/125; H04L 67/306
See application file for complete search history.

(56) References Cited

U.S. PATENT DOCUMENTS

| | | | | |
|---|---|---|---|---|
| 9,642,536 | B2* | 5/2017 | Kashef | G16H 20/70 |
| 10,529,115 | B2* | 1/2020 | Sarna | G06T 13/80 |
| 10,535,163 | B2* | 1/2020 | Li | G06N 3/045 |
| 10,668,382 | B2* | 6/2020 | Khan | A63F 13/213 |
| 10,943,271 | B2* | 3/2021 | Miller | G06Q 30/0276 |
| 2010/0121810 | A1* | 5/2010 | Bromenshenkel | G06F 3/04815 |
| | | | | 706/54 |
| 2010/0153868 | A1 | 6/2010 | Allen et al. | |
| 2010/0198653 | A1* | 8/2010 | Bromenshenkel | G06Q 30/06 |
| | | | | 715/757 |
| 2011/0149057 | A1* | 6/2011 | Beck | G01N 21/6456 |
| | | | | 348/E7.085 |
| 2013/0104058 | A1* | 4/2013 | Bromenshenkel | G06F 3/04815 |
| | | | | 715/757 |
| 2014/0200416 | A1* | 7/2014 | Kashef | G16H 20/70 |
| | | | | 600/479 |
| 2016/0110868 | A1 | 4/2016 | Cheng | |
| 2017/0367590 | A1* | 12/2017 | Sebe | G06T 7/11 |
| 2018/0005312 | A1* | 1/2018 | Mattingly | G06F 3/04815 |
| 2018/0374242 | A1* | 12/2018 | Li | G06T 15/04 |
| 2019/0099675 | A1* | 4/2019 | Khan | A63F 13/212 |
| 2021/0082300 | A1* | 3/2021 | Silverstein | G06F 3/011 |
| 2022/0129064 | A1* | 4/2022 | Gueye | G06Q 50/01 |
| 2022/0138670 | A1* | 5/2022 | Goodman | G06Q 40/02 |
| | | | | 705/7.31 |
| 2023/0267525 | A1* | 8/2023 | Singh | G06V 10/764 |
| | | | | 705/26.7 |
| 2023/0384857 | A1* | 11/2023 | Burns | G06T 19/006 |

FOREIGN PATENT DOCUMENTS

| | | |
|---|---|---|
| CN | 111243071 A | 6/2020 |
| CN | 109903320 A | 6/2021 |
| EP | 3440991 A1 | 2/2019 |
| KR | 20190035312 A | 4/2019 |

* cited by examiner

GENERATING PHYSIO-REALISTIC AVATARS FOR TRAINING NON-CONTACT MODELS TO RECOVER PHYSIOLOGICAL CHARACTERISTICS

CROSS-REFERENCE TO RELATED APPLICATIONS

This application is a continuation application of U.S. patent application Ser. No. 16/907,110, filed on Jun. 19, 2020, the entire disclosure of which is hereby incorporated by reference for all purposes.

BACKGROUND

Collecting high-quality physiological data presents numerous challenges. First, recruiting and instrumenting participants is often expensive and requires advanced technical expertise which severely limits its potential volume. This is especially true for imaging-based methods as they require recording and storing video content. Second, training datasets that have already been collected may not contain the types of motion, illumination changes or appearances that feature in the application context. Thus, a model trained on these data may be brittle and not generalize well. Third, the data can reveal the identity of the subjects and/or sensitive health information. For imaging methods this is exacerbated by the fact that most datasets of video recordings include the subjects face in some or all of the frames. It is with respect to these and other general considerations that the aspects disclosed herein have been made. Also, although relatively specific problems may be discussed, it should be understood that the examples should not be limited to solving the specific problems identified in the background or elsewhere in this disclosure.

SUMMARY

In accordance with examples of the present disclosure, synthetic data may be used to train physiological sensing systems, thereby side-stepping the challenges associated with recruiting and instrumenting participants, limited training data containing various types of motion, illumination changes or appearances, and identity protection. Once a computer graphics pipeline is in place, generation of synthetic data is much more scalable than recording videos as computation is relatively inexpensive and can be procured at will using cloud computing. In addition, rare events or typically underrepresented populations can be simulated in videos, with the proper knowledge of the statistical properties of the events or a set of examples. Furthermore, synthetic datasets would not need to contain faces or physiological signals with the likeness of any specific individual. Finally, parameterized simulations would systematically vary certain variables of interest (e.g., velocity of motion or intensity of the illumination within a video) which is both useful to train more robust methods as well as evaluating performance under different conditions.

In accordance with examples of the present disclosure, high-fidelity physio-realistic computer simulations may be utilized to augment training data that can be used to improve non-contact physiological measurements.

In accordance with at least one example of the present disclosure, a method for generating video sequences including physio-realistic avatars is provided. The method may include receiving an albedo for an avatar, modifying a sub-surface skin color associated with the albedo based on physiological data associated with physiologic characteristic, rendering an avatar based on the albedo and the modified sub-surface skin color, and synthesizing a frame of video, the frame of video including the avatar.

In accordance with at least one example of the present disclosure, a system for training a machine learning model using video sequences including physio-realistic avatars is provided. The system may include a processor, and memory storing instructions, which when executed by the processor, cause the processor to receive a request from a requesting entity to train a machine learning model to detect a physiological characteristic, receive a plurality of video segments, wherein one or more of the video segments includes a synthetic physio-realistic avatar generated with the physiological characteristic, train the machine learning model with the plurality of video segments, and provide a trained model to the requesting entity.

In accordance with at least one example of the present disclosure, a computer-readable media is provided. The computer-readable media includes instructions, which when executed by a processor, cause the processor to receive a request to recover a physiological characteristic from a video segment, obtain a machine learning model trained with training data that includes physio-realistic avatars generated with the physiological characteristic, receive a video segment, identify a measure associated with the physiological characteristic from the video segment using the trained machine learning model, and provide an assessment of the physiological characteristic to the requesting entity based on the measure.

Any of the one or more above aspects in combination with any other of the one or more aspects. Any of the one or more aspects as described herein.

This Summary is provided to introduce a selection of concepts in a simplified form, which is further described below in the Detailed Description. This Summary is not intended to identify key features or essential features of the claimed subject matter, nor is it intended to be used to limit the scope of the claimed subject matter. Additional aspects, features, and/or advantages of examples will be set forth in part in the following description and, in part, will be apparent from the description, or may be learned by practice of the disclosure.

BRIEF DESCRIPTION OF THE DRAWINGS

Non-limiting and non-exhaustive examples are described with reference to the following Figures.

DETAILED DESCRIPTION

Figure 1:
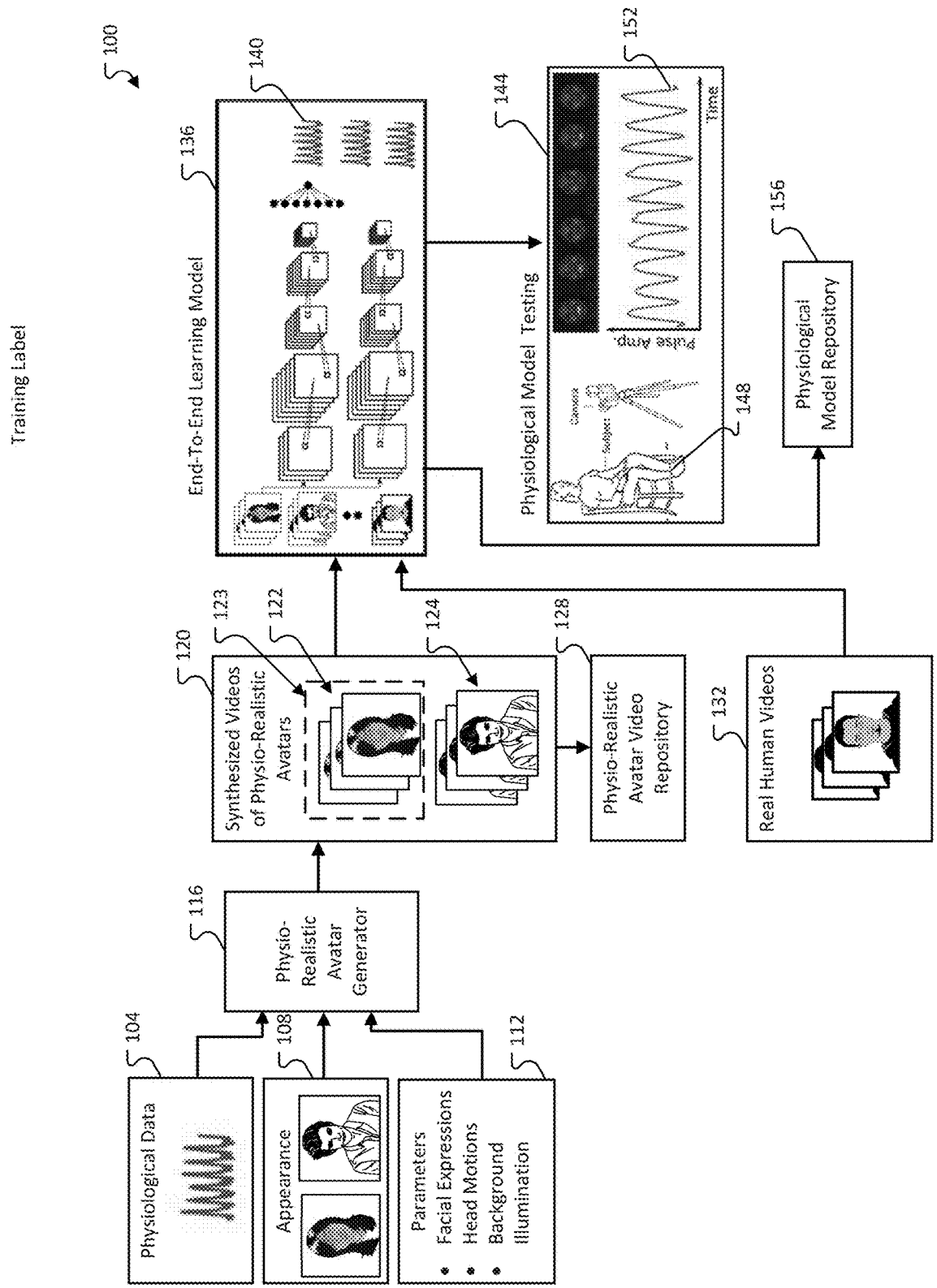
FIG. 1 depicts first details directed to generating physio-realistic avatar videos in accordance with examples of the present disclosure.

In the following detailed description, references are made to the accompanying drawings that form a part hereof, and in which are shown by way of illustrations specific embodiments or examples. These aspects may be combined, other aspects may be utilized, and structural changes may be made without departing from the present disclosure. Embodiments may be practiced as methods, systems or devices. Accordingly, embodiments may take the form of a hardware implementation, an entirely software implementation, or an implementation combining software and hardware aspects. The following detailed description is therefore not to be taken in a limiting sense, and the scope of the present disclosure is defined by the appended claims and their equivalents.

Photoplethysmography (PPG) is a non-invasive method for measuring peripheral hemodynamics and vital signals such as Blood Volume Pulse (BVP) via light reflected from, or transmitted through the skin. While traditional PPG sensors are used in contact with the skin, recent work has shown that digital imagers can also be used even at some distance from the body offering some unique benefits. First, for subjects with delicate skin (e.g., infants in an NICU, burn patients or the elderly) contact sensors can damage their skin, cause discomfort, and/or increase their likelihood of infection. Second, cameras are ubiquitous (available on many tablets, personal computers and cellphones) offering unobtrusive and pervasive health monitoring. Third, unlike traditional contact measurement devices (e.g., a smart watch) remote cameras allow for spatial mapping of the pulse signal that can be used to approximate pulse wave velocity and capture spatial patterns in the peripheral hemodynamics.

While there are many benefits of non-contact PPG measurement (a.k.a., imaging photoplethymography), this approach is especially vulnerable to different environmental factors posing relevant research challenges. For instance, recent research has focused on making iPPG measurements more robust under dynamic lighting and motion, and characterizing and combating the effects of video compression. Historically, iPPG methods often relied on unsupervised methods (e.g., independent component analysis (ICA) or principal component analysis PCA) or hand-crafted demixing algorithms. Recently, supervised neural models have been proposed providing state-of-the-art performance in the context of heart rate measurement. These performance gains are often a direct result of the model scaling well with the volume of training data; however, as with many machine learning tasks the volume and diversity of the available data soon becomes the limiting factor.

As previously mentioned, it is difficult to collect high-quality physiological data for a number of reasons. First, recruiting and instrumenting participants is often expensive and requires advanced technical expertise which severely limits its potential volume. This is especially true for imaging-based methods as they require recording and storing video content. Second, training datasets that have already been collected may not contain the types of motion, illumination changes, or appearances needed to train a model. thus, a model trained on these data may be brittle and not generalize well. Third, the data can reveal the identity of the subjects and/or sensitive health information. For imaging methods this is exacerbated by the fact that most datasets of video recordings include the subjects face in some or all of the frames.

In accordance with examples of the present disclosure, synthetic data may be utilized to train iPPG systems in order to overcome the previously mentioned challenges. Utilizing a graphics pipeline, synthetic data can be generated that is much more scalable than recording videos. In addition, generating synthetic data is relatively computationally inexpensive and can be performed using cloud computing. Rare events or typically underrepresented populations can be simulated in videos and such simulated videos would not need to contain faces or physiological signals with the likeness of any specific individual. In addition, parameterized simulations would provide a manner to systematically vary certain variables of interest (e.g., velocity of motion or intensity of the illumination within a video) which is both useful to train more robust models as well as evaluate model performance under different conditions.

Camera-based vital sign measurement using photoplethysmography involves capturing subtle color changes in skin pixels. Graphics simulation starts by assuming there is a light source that has a constant spectral composition but varying intensity. Accordingly, the red, green, blue (RGB) values of the k-th skin pixel in an image sequence can then be defined by a time-varying function:

$$C_k(t) = I(t) \cdot (v_s(t) + v_d(t)) + v_n(t) \quad \text{Equation 1}$$

$$C_k(t) = I(t) \cdot (v_s + v_{abs}(t) + v_{sub}(t)) + v_n(t) \quad \text{Equation 2}$$

where $C_k(t)$ denotes a vector of the RGB color channel values; I(t) is the luminance intensity level, which changes with the light source as well as the distance between the light source, skin tissue and camera; I(t) is modulated by two components in the DRM: specular (glossy) reflection $v_s(t)$, mirror-like light reflection from the skin surface, and diffuse reflection $v_d(t)$. The diffuse reflection in turn has two parts: the absorption $v_{abs}(t)$ and sub-surface scattering of light in skin-tissues $v_{sub}(t)$; $v_n(t)$ denotes the quantization noise of the camera sensor. I(t), $v_s(t)$ and $v_n(t)$ can all be decomposed into a stationary and a time-dependent part through a linear transformation:

$$v_d(t) = u_d \cdot d_0 + (u_{abs} + u_{sub}) \cdot p(t) \quad \text{Equation 4}$$

where $u_d$ denotes the unit color vector of the skin-tissue; $d_0$ denotes the stationary reflection strength; $v_{abs}(t)$ and $v_{sub}(t)$ denote the relative pulsatile strengths caused by both changes in hemoglobin and melanin absorption and changes in subsurface scattering respectively, as the blood volume changes; p(t) denotes the BVP.

$$v_s(t) = u_s \cdot (s_0 + \Phi(m(t), p(t))) \quad \text{Equation 5}$$

where $u_s$ is the unit color vector of the light source spectrum; $s_0$ and $\Phi(m(t), p(t))$ denote the stationary and varying parts of specular reflections; m(t) denotes all the non-physiological variations such as flickering of the light source, head rotation, facial expressions and actions (e.g., blinking, smiling).

$$I(t) = I_0 \cdot (1 + \psi(m(t), p(t))) \quad \text{Equation 6}$$

where $I_0$ is the stationary part of the luminance intensity, and $I_0 \cdot \psi(m(t), p(t))$ is the intensity variation observed by the camera. The interaction between physiological and non-physiological motions, $\Phi(\bullet)$ and $\psi(\bullet)$, are usually complex non-linear functions. The stationary components from the specular and diffuse reflections can be combined into a single component representing the stationary skin reflection:

$$u_c \cdot c_0 = u_s \cdot s_0 + u_d \cdot d_0 \quad \text{Equation 7}$$

where $u_c$ denotes the unit color vector of the skin reflection and $c_0$ denotes the reflection strength. Substituting (3), (4), (5) and (6) into (1), produces:

$$C_k(t) = I_0 \cdot (1 + \psi(m(t), p(t))) \cdot (u_c \cdot c_0 + u_s \cdot \Phi(m(t), p(t)) + (u_{abs} + u_{sub}) \cdot p(t)) + v_n(t) \quad \text{Equation 8}$$

As the time-varying components are orders of magnitude smaller than the stationary components in equation 7, any product between varying terms can be neglected to approximate $C_k(t)$ as:

$$C_k(t) \approx u_c \cdot I_0 \cdot c_0 + u_c \cdot I_0 \cdot c_0 \cdot \Psi(m(t), p(t)) + u_s \cdot I_0 \cdot \Phi(m(t), p(t)) + (u_{abs} + u_{sub}) \cdot I_0 \cdot p(t) + v_n(t) \quad \text{Equation 9}$$

For synthesizing data for physiological measurement methods, it is desirable to create skin with RGB changes that vary with p(t). Using a principled bidirectional scattering distribution function (BSDF) shader, both of the components of $u_p$, $u_{abs}$ and $u_{sub}$ can be captured using the subsurface color and subsurface radius parameters. The specular reflections are controlled by the specular parameter. Thus, for a given pulse signal, p(t), the skin's appearance over time can be synthesized. Furthermore, the skin's appearance together with changes in a wide variety of other variations can be synthesized, which for the purposes of vital sign measurement represents noise sources. Data synthesized in this way is very useful for improving the generalizability of camera-based vital signal measurement algorithms.

For any of the video-based physiological measurement methods, the task is to extract p(t) from $C_k(t)$. The motivation for using a machine learning model to capture the relationship between $C_k(t)$ and p(t) in equation 8 is that a neural model can capture more complex relationships than hand-crafted demixing or source separation algorithms (e.g., ICA, PCA) that have ignored p(t) inside $\Phi(\bullet)$ and $\Psi(\bullet)$, and assumed a linear relationship between $C_k(t)$ and p(t).

High-fidelity facial avatars and physiologically based animation models (the basis for which is described above) are generated for simulating videos of faces with a realistic blood flow (pulse) signal. These videos are then used to train a neural model for recovering the blood volume pulse (BVP) from video sequences. The resulting model may be tested on real video benchmark datasets.

To synthesize the physio-realistic appearance of the avatars, photoplethysmographic waveforms recordings may be used. For example, various photoplethysmograms (PPG) and respiration datasets with varying contact PPG recordings and sampling frequencies from different individuals may be used. The PPG recordings from different subjects may be used to synthesize multiple avatars. The synthesized video may be of any length, such as a short sequence (nine 10-second sequences); accordingly, only a small portion of a PPG recording may be used.

A realistic model of facial blood flow is synthesized in order to train a machine learning model. Accordingly, blood flow may be simulated by adjusting properties of the physically based shading material used to render the face of the avatar. That is, the albedo component of the material is a texture map transferred from a high-quality 3D face scan. In some instances, the facial hair has been removed from these textures so that the skin properties can be easily manipulated (3D hair can be added later in the process). Specular effects are controlled with a roughness map, to make some parts of the face (e.g. the lips) shinier than others.

As blood flows through the skin, the composition of the skin changes and causes variations in subsurface color. The skin tone changes may be manipulated using subsurface color parameters. The weights for the subsurface color parameters may be derived from the absorption spectrum of hemoglobin and typical frequency bands from digital cameras. Accordingly, the subsurface color parameters may be varied across all skin pixels on an albedo map (but not non-skin pixels). An albedo map may be an image texture without any shadows or highlights. Further, the subsurface radius for the channels to capture the changes in subsurface scattering as the blood volume varies. The subsurface scattering is spatially weighted using a subsurface scattering radius texture which captures variations in the thickness of the skin across the face. The BSDF subsurface radii for the RGB channels may be varied using the same weighting prior as above. Empirically these parameters work for synthesizing data for training camera-based vital sign measurement. Varying the subsurface scattering alone, without changes in subsurface color, may be too subtle and may not recreate the effects the BVP on reflected light observed in real videos. Alternatively, or in addition, color spaces other than RGB may be used. For example, color spaces including luminance and chrominance channels (e.g., YUV, Y'UV, YCrCb, Y'CrCb may be used. Similarly, the hue, saturation, and value (HSV) color space may be used.

By precisely specifying what type of variation appears in the data, a machine learning system may be trained that is robust to that form of variation encountered in the real world. A number of different systematic variations may be employed with the aspects disclosed herein such as, facial appearance, head motion, facial expression, and environment. For example, faces may be synthesized with fifty different appearances. For each face, the skin material may be configured with an albedo texture picked at random from an albedo collection. In order to model wrinkle-scale geometry, a matching high-resolution displacement map that was transferred from the scan data may be applied. Skin type is particularly important in imaging PPG measurement; accordingly, an approximate skin type distribution for the faces may include a distribution that is not uniform but does represent a much more balanced distribution than in existing imaging PPG datasets. Since motion is one of the greatest sources of noise in imaging PPG measurement, a set of rigid head motions may be simulated to augment training examples that capture these conditions. In particular, the head may be smoothly rotated about the vertical axis at angular velocities of 0, 10, 20, and 30 degrees/second similar to head motions, facial expressions movements are also a frequent source of noise in PPG measurement. To simulate expressions, videos may be synthesized with smiling, eye blinking, and mouth opening (similar to speaking), which are some of the most common facial expressions exhibited in everyday life. Smiles and blinks may be applied to the face using blend shapes, and the mouth may be opened by rotating the jawbone with linear blend skinning. Faces may be rendered in different image-based environments to create a realistic variety in both background appearance and illumination on the face. Both static backgrounds and backgrounds with motion may be used. In some instances, even facial occlusions that more closely resemble challenging real-life conditions were included.

FIG. 1 depicts details directed to generating and then using physio-realistic synthetic avatars to train a machine learning model for detection of a physiological signal in accordance with examples of the present disclosure. That is, a physio-realistic avatar generator 116 may generate synthesized videos of physio-realistic avatars 120; the synthesized videos of physio-realistic avatars 120 may then be used to train an end-to-end learning model 136, such as a neural model, for recovering or identifying a particular physiological response from video sequences. The physio-realistic avatar generator 116 may synthesize the physio-realistic avatars based on physiological data 104, appearance data 108, and parameter data 112. The physiological data 104 may include one or more signals indicative of a physiologic response, condition, or signal. For example, the physiological data 104 may correspond to blood volume pulse measurements based on a real human recording, such as a blood volume pulse waveform. As another example, the physiological data 104 may correspond to a respiratory rate/waveform, a heart condition indicated by a waveform or measurement such as atrial fibrillation, and/or oxygen saturation levels. For example, the physiological data 104 may correspond to ballistocardiography (BCG) and/or respiration data and may be a ballistocardiographic waveform or respiratory waveform. As another example, the physiological data 104 may be a photoplethysmographic waveform. A photoplethysmography waveform may be generated by an optical sensor to measure blood volume changes in a non-contact manner. Photoplethysmograph provides useful physiological information to assess the cardiovascular function and PPG signals are commonly measured by transmission and reflection methods which sense light transmitted through or reflected by tissues. In some examples, the physiological data 104 may be utilized to assess one or more conditions, such as but not limited to peripheral arterial disease, the Raynaud's phenomenon and systemic sclerosis, and Takayasu's arteritis. A PPG waveform also changes with breathing pattern. For example, the amplitude, frequency, and baseline of PPG waveform are modulated by respiration. The physiological data 104 may include other waveforms, measurements, or otherwise and may be from different individuals. In some examples, the waveforms may be recordings of various lengths and various sample rates.

The appearance data 108 may include skin material with an albedo texture selected from random. In some examples, the albedo component of the material is a texture map transferred from a high-quality 3D face scan. As noted above, in some examples, the facial hair has been removed from these textures so that the skin properties can be easily manipulated. Specular effects may be controlled to make some parts of the face (e.g. the lips) shinier than others. In some examples, wrinkle-scale geometry may be applied using a high-resolution displacement map transferred from scan data. Skin type may also be randomly selected. For example, skin type may be selected from one of the six Fitzpatrick skin types. The Fitzpatrick skin type (or phototype) depends on the amount of melanin pigment in the skin. This is determined by constitutional color (white, brown or black skin) and the result of exposure to ultraviolet radiation (tanning). The Fitzpatrick skin types may include: I. pale white skin; II. fair skin; III. darker white skin; IV. light brown skin; V. brown skin; and VI. dark brown or black skin. In some examples, skin type classifications other than Fitzpatrick skin types may be utilized.

The parameter data 112 may include parameters affecting the avatar and/or light transmission and reflectance. For example, the parameter data 112 may include facial expressions, head motions, background illumination, environment, etc. Since motion is one of the greatest sources of noise in imaging PPG measurement, rigid head motions may be used to augment training examples that capture such conditions. A head may be rotated about the vertical axis at varying degrees of angular velocities, such as 0, 10, 20, and 30 degrees/second. Similarly, to simulate expressions, videos may be synthesized with smiling, eye blinking, and mouth opening (similar to speaking), and/or other common facial expressions exhibited in everyday life. Smiles and blinks may be applied to the face using a collection of blend shapes; the mouth may be opened by rotating the jawbone with linear blend skinning. In addition, different environments may be utilized to render the avatars to create a realistic variety of avatars in both background appearance and illumination on the face. In some examples, a video sequence depicting a physio-realistic avatar may include a static background. Alternatively, or in addition, the background may include motion or avatar occlusions that more closely resemble challenging real-life conditions. The parameter data 112 may also include environmental conditions; for example, the parameter data 112 may include temperature, time of day, weather such as wind, rain, snow, etc.

The physiological data 104, appearance data 108, and parameter data 112 may be provided to the physio-realistic avatar generator 116. The physio-realistic avatar generator 116 may use a bidirectional scattering distribution function (BSDF) shader to render the physio-realistic avatar and combine the physio-realist avatar with a background. Further, synthesized videos of physio-realistic avatars 120 may be generated. The synthesized videos of physio-realistic avatars 120 may include various video sequences depicting different physio-realistic avatars 122 and 124 for example. In some examples, the physio-realistic video sequence and/or physio-realistic avatars may be stored in the physio-realistic avatar video repository 128. One or more of the physio-realistic avatars 122 may be tagged as training data 123. An example of a training label includes, but is not limited to blood volume pulse and/or peripheral arterial disease. Accordingly, when using the synthesized video to train a machine learning model, the label may identify one or more characteristics of the video as training and/or test/validation data. The synthesized videos of physio-realistic avatars 120 may be provided to an end-to-end learning model 136, such as a convolutional attention network (CAN) to evaluate the impact of synthetic data on the quality of recovered physiologic signal 140 from the video sequences. In addition, the end-to-end learning model 136 may be trained with the synthesized videos of physio-realistic avatars 120 in addition to real human videos 132.

The CAN uses motion and appearance representations learned jointly through an attention mechanism. The approach mainly consists of a two-branch convolutional neural network, the motion branch allows the network to differentiate between intensity variations caused by noise, e.g., from motion from subtle characteristic intensity variations induced by physiological characteristic, such as blood flow. The motion representation is the difference of two consecutive video frames. To reduce the noise from changes in ambient illumination and the distance of the face to the illumination source, the frame difference is first normalized based on the skin reflection model. The normalization is applied to a video sequence by subtracting the pixel mean and dividing by the standard deviation. The appearance representation captures the regions in the image that contribute strong iPPG signals. Via the attention mechanism, the appearance representation guides the motion representation and helps differentiate the iPPG signal from the other sources of noise. The input frames are similarly normalized by subtracting the mean and dividing by the standard deviation.

Once trained with physio-realistic avatars and/or the real human videos 132, the end-to-end learning model 136 may be used to evaluate video information of a subject 148. The subject 148 may be instrumented such that a physiological signal provided by a gold standard, contact and/or non-contact measurement device or sensor can be compared to the recovered physiologic signal 152 for the same participant. Accordingly, the two physiological signals may be compared to one another to determine an effectiveness of the end-to-end learning model 136. Upon finding that the end-to-end learning model 136 is effective and/or of desired accuracy, the trained model, including the model structure and model weights, may be stored in the physiological model repository 156 such that the trained model may be used to recover a physiological signal of different participants or subjects.

Figure 2:
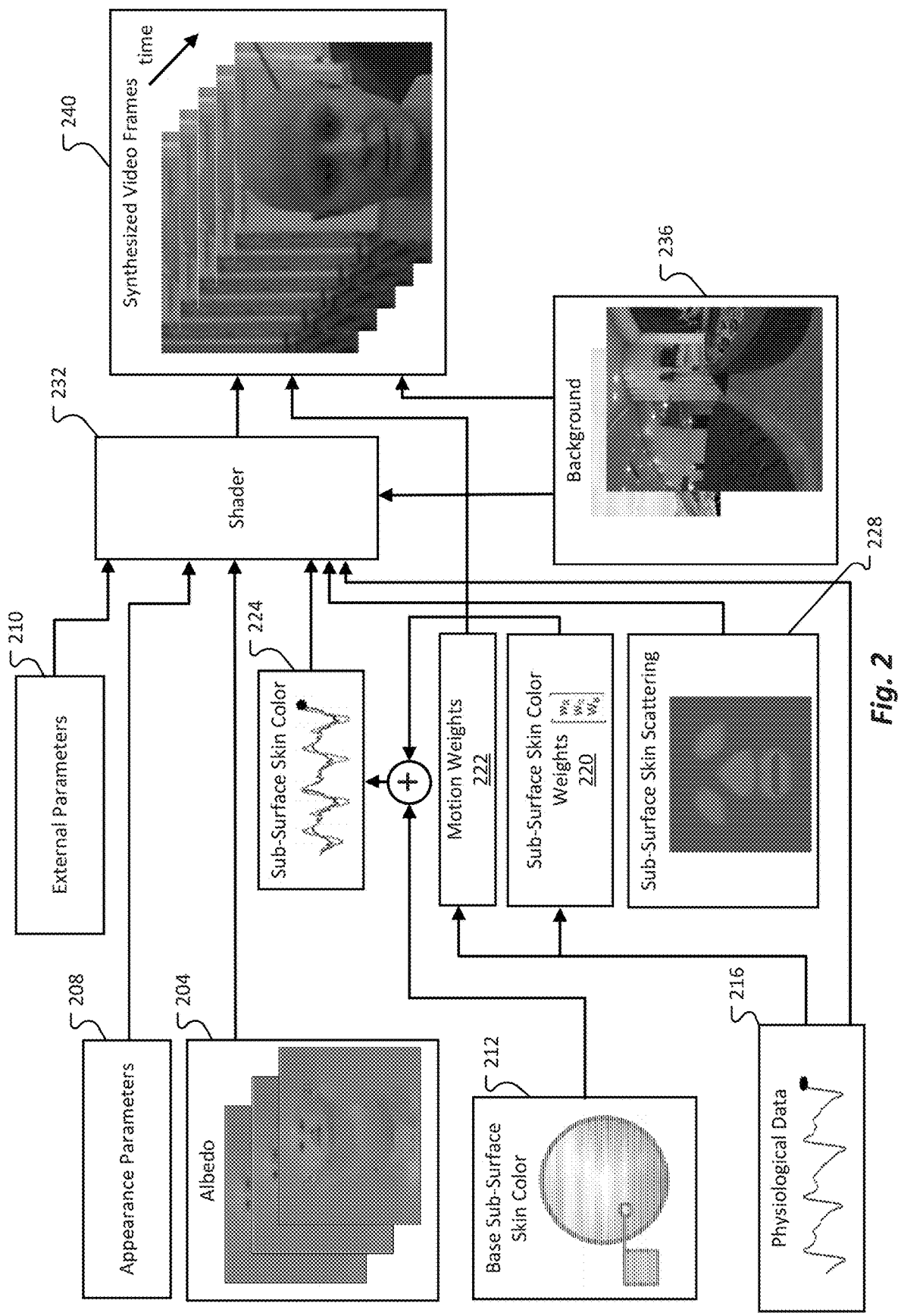
FIG. 2 depicts details directed to rendering and synthesizing video frames including physio-realistic avatars in accordance with examples of the present disclosure.

FIG. 2 depicts additional details directed to synthesizing video frames including physio-realistic avatars in accordance with examples of the present disclosure. More specifically, an albedo 204 may be selected; the selection section of the albedo 204 may correspond to a texture map transferred from a high-quality 3D face scan. The albedo may be chosen at random or chosen to represent a specific population. The albedo may be devoid of facial hair so that the skin properties can be easily manipulated. Other parameters affecting appearance, such as but not limited to skin color/type, hair, specular effects, wrinkles, etc., may be added via appearance parameters 208. Skin type may be randomly selected or selected to represent a specific population. For example, skin type may be selected from one of the six Fitzpatrick skin types, however one of skill in the art will appreciate that classifications other than Fitzpatrick skin types may be utilized.

As blood flows through the skin, the composition of the skin changes and causes variations in subsurface color. Accordingly, skin tone changes may be manipulated using the subsurface color parameters including, but not limited to, the base sub-surface skin color 212, the sub-surface skin color weights 220, and sub-surface skin scattering parameters 228. The weights for the sub-surface skin color weights 220 may be derived from the absorption spectrum of hemoglobin and typical frequency bands from example digital cameras. For example, an example camera may provide color based on the following frequency bands: red: 550-700 nm; green: 400-650 nm; and blue: 350-550 nm. The sub-surface skin color weights 220 may include a weight for one or more of the color channels and may be applied to the physiological data 216, where the physiological data 216 may be same as or similar to the physiological data 104 previously described and may include one or more signals indicative of a physiologic response, condition, or signal. For example, the physiological data 216 may correspond to blood volume pulse measurements based on a real human recording, such as a blood volume pulse waveform. As another example, the physiological data 216 may correspond to a respiratory rate/waveform, a heart condition indicated by a waveform or measurement such as atrial fibrillation, and/or oxygen saturation levels. For example, the physiological data 216 may correspond to ballistocardiography (BCG) and may be a ballistocardiographic waveform. As another example, the physiological data 216 may be a photoplethysmographic waveform. In some examples, the physiological data 216 may be based on signal measurement from an actual human or may be synthesized based on known physiological signal characteristics indicative of a physiological response, condition, or signal. The weighted physiological data signal resulting from the application of the sub-surface skin color weights 220 may be added to the base sub-surface skin color 212 resulting in the sub-surface skin color 224 comprising multiple color channels. The sub-surface skin color 224 may be provided to the shader 232. In some examples, the sub-surface skin color weights 220 may be applied to all pixels determined to be facial pixels on the albedo map; the sub-surface skin color weights 220 may not be applied to non-skin pixels.

In addition, the subsurface radius may be manipulated for the color channels to capture the changes in subsurface scattering as the physiological characteristic, such as blood volume, varies. The subsurface scattering is spatially weighted using a subsurface scattering radius texture which captures variations in the thickness of the skin across the face. The subsurface radii for the RGB channels may be varied using weights that are the same or similar to the sub-surface skin color weights 220.

In some examples, external parameters 210 may alter a skin tone and color. The external parameters 210 may include parameters affecting the avatar and/or light transmission and reflectance. For example, the external parameters 210 may include facial expressions, head motions, background illumination, environment, etc. Since motion is one of the greatest sources of noise in imaging PPG measurement, rigid head motions may be used to augment training examples that capture such conditions. A head may be rotated about the vertical axis at varying degrees of angular velocities, such as 0, 10, 20, and 30 degrees/second. Similarly, to simulate expressions, videos may be synthesized with smiling, eye blinking, and mouth opening (like speaking), and/or other common facial expressions exhibited in everyday life. Smiles and blinks may be applied to the face using a collection of blend shapes; the mouth may be opened by rotating the jawbone with linear blend skinning.

In some examples, the physiological processes that are modeled cause both color and motion changes; accordingly, motion weights 222 may be applied to the physiological data 216 to account for pixel movement and pixel translation caused, at least in part by, the physiological data 216. For example, a region, portion, or area represented by one or more pixels, may move from a first location in a first frame to a second location in a second frame. Accordingly, the motion weights may provide a mechanism for identifying and/or addressing specific pixels of the input image that move or translate due, at least in part to, the physiological characteristic. As an example, blood flowing through a vein, artery, and/or under the skin may cause the vein, artery, and/or skin to distort in one or more directions. The motion weights 222 may account for such movement or translation, and in some instances may be represented as a vector.

In examples, the shader 232 may provide an initial rendering of one or more pixels of the avatar based on the external parameters 210, the appearance parameters 208, the sub-surface skin color 224, the sub-surface skin scattering parameters 228, the motion weights, and the physiological data 216. Of course, other parameters may be considered as well. The shader 232 may be a program that runs in a graphics pipeline providing instructions to a computer processing unit, such as a graphics processing unit, that indicate how to render one or more pixels. In examples, the shader 232 may be a principled bidirectional scattering distribution function (BSDF) shader, that determines the probability that a specific ray of light will be reflected (scattered) at a given angle.

The image rendered by the shader 232 may be an avatar for a specific frame of video. In some examples, a background 236 may be added to the avatar such that the avatar appears in front of an image. In some examples, the background 236 may be static; in some examples, the background 236 may be dynamic. And further, in some examples, a foreground object included with the background 236 may occlude a portion of the avatar. The sequence of frames 240 may be synthesized at 240 such that a video sequence is obtained. Such frames may be assembled with a video synthesizer configured to apply backgrounds and/or assemble a plurality of frames or images into a video sequence. In some examples, the background 236 may be rendered together with the avatar by the shader 232.

Figure 3:
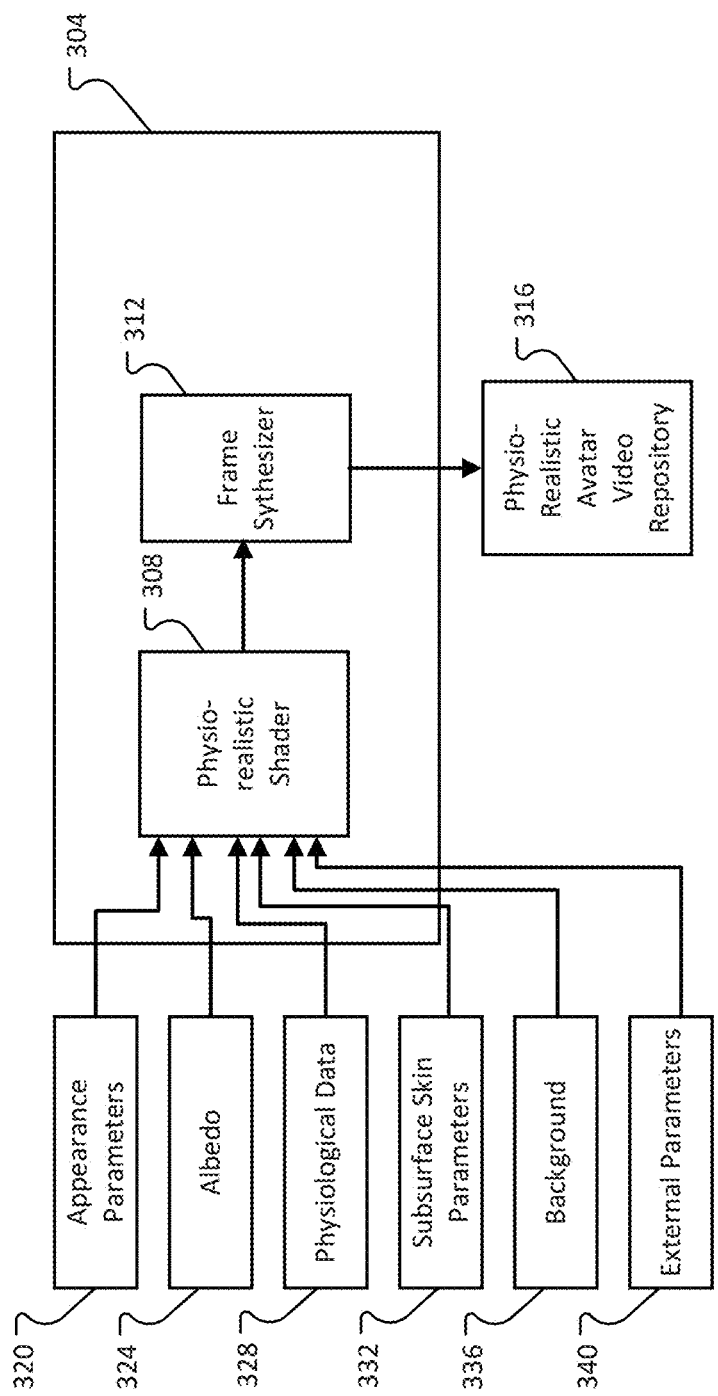
FIG. 3 depicts second details directed to generating physio-realistic avatar videos in accordance with examples of the present disclosure.

FIG. 3 depicts additional details of the directed to a physio-realistic video generator 304 configured to render and synthesize physio-realistic video sequences including physio-realistic avatars in accordance with examples of the present disclosure. The physio-realistic video generator 304 may be a computing device and/or specialized computing device specifically configured to render and synthesize video. The physio-realistic video generator 304 may include multiple devices and/or utilize a portion of a cloud infrastructure to divide one or more portions of the rendering and/or synthesizing tasks among different devices. The physio-realistic video generator 304 may include a physio-realistic shader 308 and a frame synthesizer 312.

The physio-realistic shader 308 may be the same as or similar to the shader 232 and may provide an initial rendering of one or more pixels of an avatar based on the appearance parameters 320, the albedo 324, the physiological data 328, the sub-surface skin parameters 332, the background 336, and the external parameters 340. Of course, other parameters may be considered by the physio-realistic shader 308 as well. The appearance parameters 320 may be the same as or similar to the appearance parameters 208; the albedo 324 may be the same as or similar to the albedo 204; the physiological data 328 may be the same as or similar to the physiological data 216; the sub-surface skin parameters 332 may be the same as or similar to the base sub-surface skin color 212, the sub-surface skin color weights 220, the sub-surface skin scattering parameters 228; the background 336 may be the same as or similar to the background 236, and the external parameters 340 may be the same as or similar to the external parameters 210.

The image rendered by the physio-realistic shader 308 may be an avatar exhibiting a specific physiological response based on the physiological data 328 and may be rendered to a frame of video as previously discussed. In some examples, the avatar may be rendered in front of a background 336 such that the avatar appears in front of an image. In some examples, the background 336 may be static; in some examples, the background 336 may be dynamic. And further, in some examples, a foreground object included in the background 336 may occlude a portion of the avatar. The frames generated by the physio-realistic shader 308 may be provided to the frame synthesizer 312 for synthesizing and for assembling the frames into a video sequence. The synthesized video may then be provided to the physio-realistic avatar video repository 316 which may be the same as or like the physio-realistic avatar video repository 128.

The synthesized video may be tagged or labeled prior to being stored; alternatively, or in addition, the synthesized video may be stored in a location or repository associated with a specific label. An example of a label includes, but is not limited to blood volume pulse and/or peripheral arterial disease. Accordingly, when using the synthesized video to train a machine learning model, the label may identify one or more characteristics of the video as training and/or test/validation data.

Figure 4:
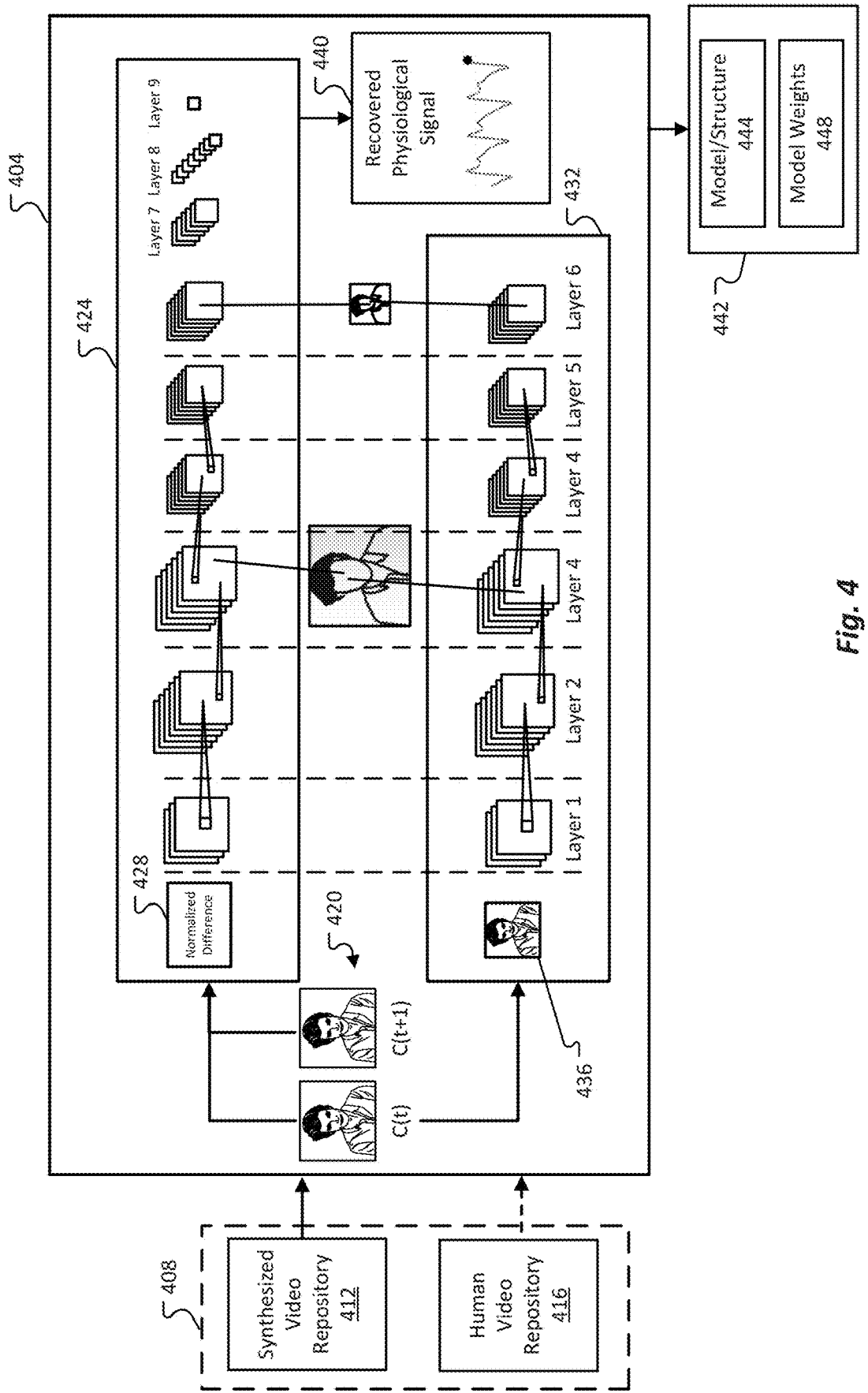
FIG. 4 depicts details directed to training a machine learning model in accordance with examples of the present disclosure.

FIG. 4 depicts additional details directed to training a machine learning structure 404 to build a machine learning model 442 based on training data 408 including synthesized physio-realistic videos from a synthesized video repository 412 and human videos from a human video repository 416 in accordance with examples of the present disclosure. The synthesized physio-realistic videos may be output from the frame synthesizer 312 as previously described and may be labeled with a training label to identify one or more physiological characteristics. An example of a training label includes, but is not limited to blood volume pulse and/or peripheral arterial disease. The human videos are videos of real individuals. In some examples, the machine learning structure 404 utilizes training data that includes synthesized physio-realistic videos, human videos, or a combination of the two. The machine learning structure 404 may be stored in a file as processor executable instructions such that when a collection of algorithms associated with the machine learning structure 404 are executed by a processor, a machine learning model 442 including various layers and optimization functions and weights is constructed. That is, the various layers comprising the architecture of the machine learning structure 404 may iteratively train utilizing the training data 408 to recover a physiological signal 440 present in the training data 408. The various layers comprising the machine learning structure 404 may be trained to identify and obtain the physiological signal 440. After many iterations, or epochs, the configuration of the machine learning structure 404 (e.g., the various layers and weights associated with one or more layers) having the least amount of error associated with an iteration may be utilized as the machine learning model 442, where the structure of the machine learning model may be stored in the model file 444 and the weights associated with one or more layers and/or configurations may be stored in the model weights file 448.

In accordance with examples of the present disclosure, the machine learning structure 404 may include two paths; a first path associated with a motion model 424 and a second path associated with an appearance model 432. The architecture of the motion model 424 may include nine layers with 128 hidden units for example. In addition, an average pooling and hyperbolic tangent may be utilized as the activation functions. The last layer of the motion model 424 may include linear activation units and a mean squared error (MSE) loss. The architecture of the appearance model 432 may be the same as the motion model 424 but without the last three layers (e.g., Layer 7, Layer 8, and Layer 9).

The motion model 424 allows the machine learning structure 404 to differentiate between intensity variations caused by noise, e.g., from motion from subtle characteristic intensity variations induced by the physiological characteristic. The motion representation is computed from the input difference of two consecutive video frames 420 (e.g., C(t) and C(t+1). The ambient illumination may not be uniform on the face and the illumination distribution changes with the distance of the face to the light source and may be affecting the supervised learning approach. Therefore, to reduce these sources of illumination noise, the frame difference is first normalized at 428 using an AC/DC normalization based on the skin reflection model. The normalization may be applied once to the entire video sequence by subtracting the pixel mean and dividing by the standard deviation. In addition, one or more of the layers, Layer 1-Layer 5, may be a convolution layer of different or the same size and may be utilized to identify various feature maps utilized through the training of the machine learning structure 404. In examples, the normalization difference 428 may correspond to a normalized difference for three color channels, such as a red, green, and/or blue color channel. The various layers of the motion model 424 may include feature maps and/or various convolutions of various sizes and color channels.

The appearance model 432 allows the machine learning structure 404 to learn which regions in the image are likely to be reliable for computing strong physiological signals, such as iPPG signals. The appearance model 432 may generate a representation from an input video frame's texture and color information. The appearance model 432 guides the motion representation to recover iPPG signals from various regions included in the input image, and to further differentiate between them from other sources of noise. The appearance model 432 may take as input a single image or frame of video. That is, a single frame of video or image 436 may be utilized as an input to the various layers, Layers 1-Layers 6).

Once trained, the machine learning structure 404 may be output as a machine learning model 442 where the structure of the machine learning structure 404 may be stored in the model file 444 and the various weights of the machine learning model are stored in the model weights file 448. Although depicted with a specific deep learning implementation, it should be understood that the machine learning structure may be modified, tuned, or otherwise changed to achieve a greatest amount of accuracy associated with detecting a physiological signal, such as blood volume pulse.

Figure 5:
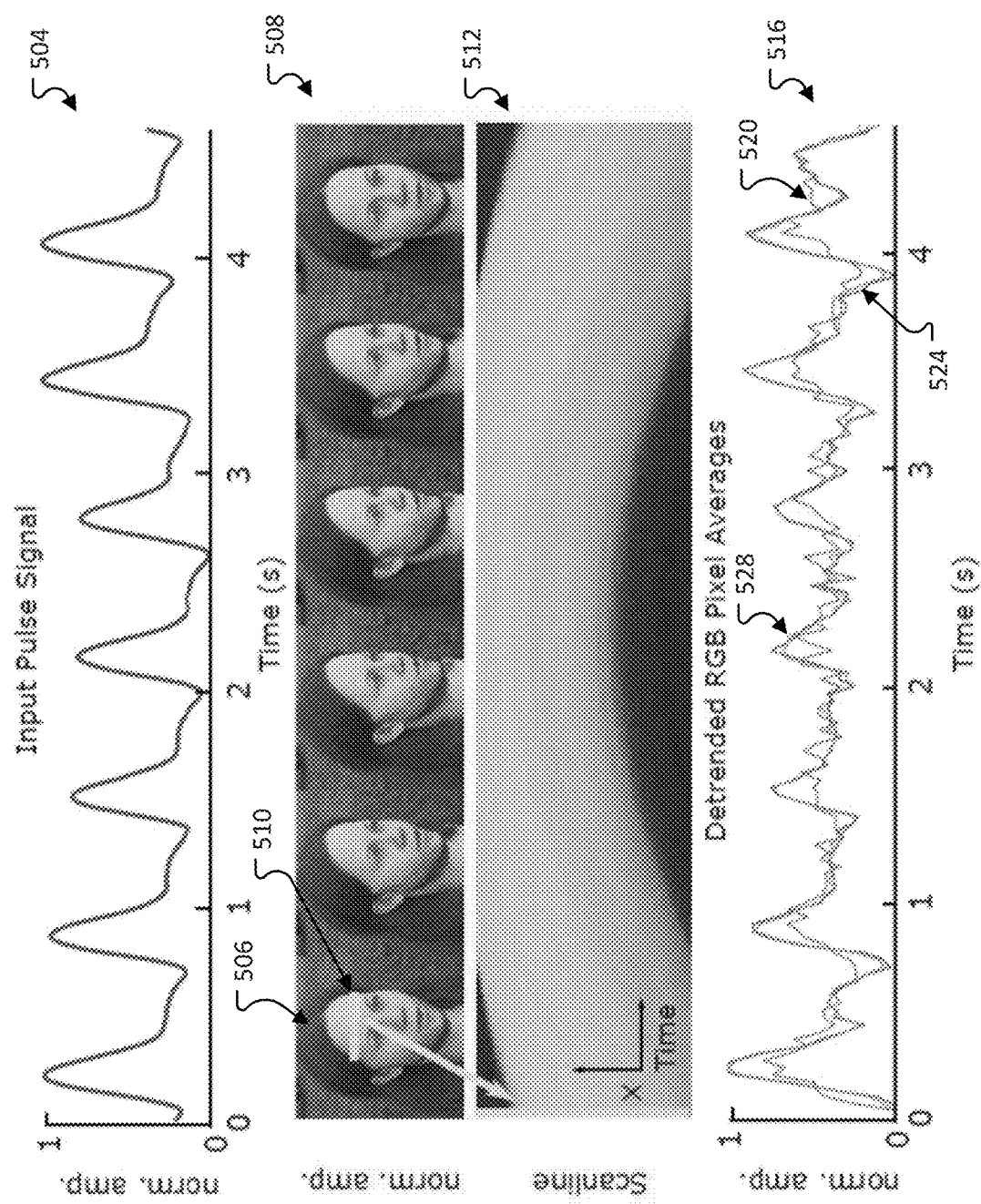
FIG. 5 depicts an example rendering of an avatar that includes a physiological data signal in accordance with examples of the present disclosure.

FIG. 5 depicts an example of how an input physiological signal 504, such as a pulse signal, is rendered to the physio-realistic avatar and influences the RGB pixel values in the resulting video frames 508. For example, an input physiological signal 504 may correspond to a blood volume flow based on a real human recording; the input physiological signal 504 may be a blood volume pulse waveform. As another example, the physiological signal 504 may correspond to a respiratory rate/waveform, a heart condition indicated by a waveform or measurement such as atrial fibrillation, and/or oxygen saturation levels. For example, the physiological signal 504 may correspond to ballistocardiography (BCG) data and may be a ballistocardiographic waveform. As another example, the physiological signal 504 may be a photoplethysmographic waveform. The physiological signal 504 may include other waveforms, measurements, or otherwise and may be from different individuals. In some examples, the waveforms may be recordings of various lengths and various sample rates.

As depicted in FIG. 5, an avatar 506 exhibiting the physiological signal 504 may be generated in multiple video frames 508 of a video sequence as previously described. A scanline 510 of the avatar 506 is depicted over time in 512. The corresponding RGB pixels (red 520, blue 524, and green 528) are depicted over time in the graph 516. As shown in the graph 516, a detrended waveform corresponding to a pulse signal can be identified from the RGB pixels. Alternatively, or in addition, color spaces other than RGB may be used. For example, color spaces including luminance and chrominance channels (e.g., YUV, Y'UV, YCrCb, Y'CrCb may be used. Similarly, the hue, saturation, and value (HSV) color space may be used.

Figure 6:
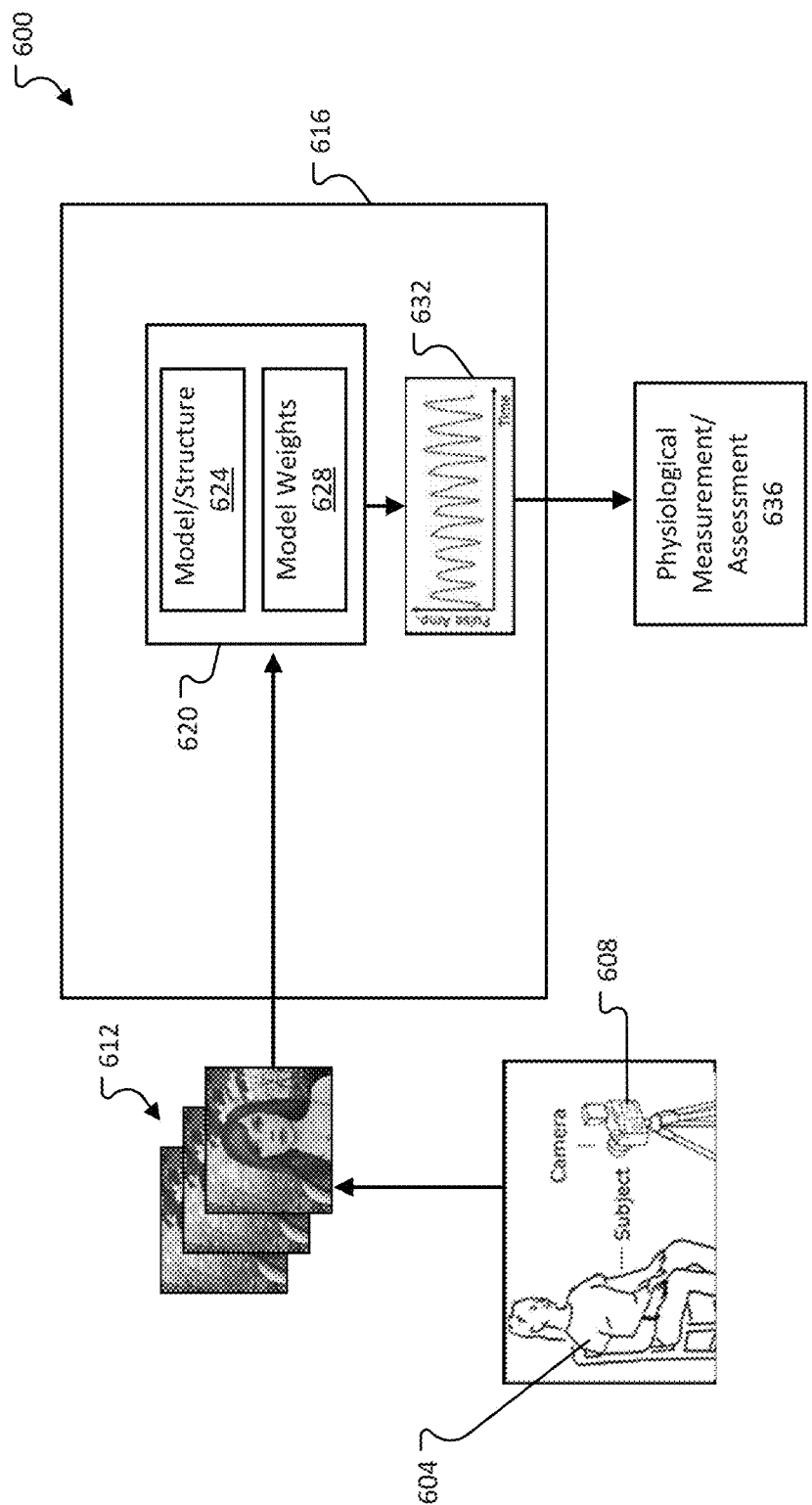
FIG. 6 depicts details directed to using a trained machine learning model to recover a physiological signal in accordance with examples of the present disclosure.

FIG. 6 depicts additional details of a system 600 for using a trained machine learning model to recover a physiological signal from a video sequence in accordance with examples of the present disclosure. The system 600 may include a subject, or patient 604 within a field-of-view of a camera 608. The subject 604, or patient, may be a real human and may or may not exhibit one or more physiological characteristics. For example, the system 600 may utilize a trained machine learning model, such as the machine learning model 620, to recover, or determine, one or more physiological characteristics of the subject 604. The physiological characteristics may be a pulse rate and/or an assessment of a cardiovascular function. As non-limiting examples, peripheral arterial disease, the Raynaud's phenomenon and systemic sclerosisa, and Takayasu's arteritis may be assessed. While examples provided herein are substantially directed to cardiovascular functions, other physiological characteristics and/or conditions are contemplated.

The camera 608 may correspond to any camera capable of capturing or taking a plurality of images. In some examples, the camera 608 may capture a sequence of frames 612, or images, at a specific frame rate. An example frame rate may include but is not limited to 32 frames per second or 16 frames per second. Of course, other frame rates are contemplated herein. The camera may provide the video including the sequence of frames 612 to a physiological measurement device 616. The physiological measurement device 616 may be a computing device or other device capable of executing the machine learning model 620. In some examples, the physiological measurement device 616 may be distributed amongst several computing devices and/or may utilize a cloud infrastructure. In some examples, the physiological measurement device 616 may comprise a service, such as a web service that receives a sequence of frames and provides a recovered physiological signal, such as a heart rate.

The physiological measurement device 616 may execute the machine learning model 620 to process the sequence of frames 612. In examples, the machine learning model 620 may utilize the model/structure data 624 to create, or generate, a model structure. The model structure may be the same as or similar to the machine learning structure that was trained with one or more video sequences. For example, the model/structure data 624, upon being executed, or ran by the physiological measurement device 616, may generate a model structure that is similar to the machine learning structure of FIG. 4. The model weights data 628 may be utilized to weight one or more portions, or features, of the newly created model structure as determined during the machine learning process. Accordingly, the machine learning model 620 may receive the sequence of frames 612 and process the frames to recover, or identify, a physiological signal 632. The physiological measurement device 616 may further process the recovered physiological signal 632 to output, or provide, a physiological measurement or assessment 636. The physiological measurement may be a rate, such as a pulse rate for example. In some examples, the physiological assessment may correspond to a measure of similarity to a predicted training label, such as a condition. In some examples, the physiological measurement or assessment 636 may be stored in a repository or provided to the subject 604 or caregivers of the subject 604.

Figure 7:
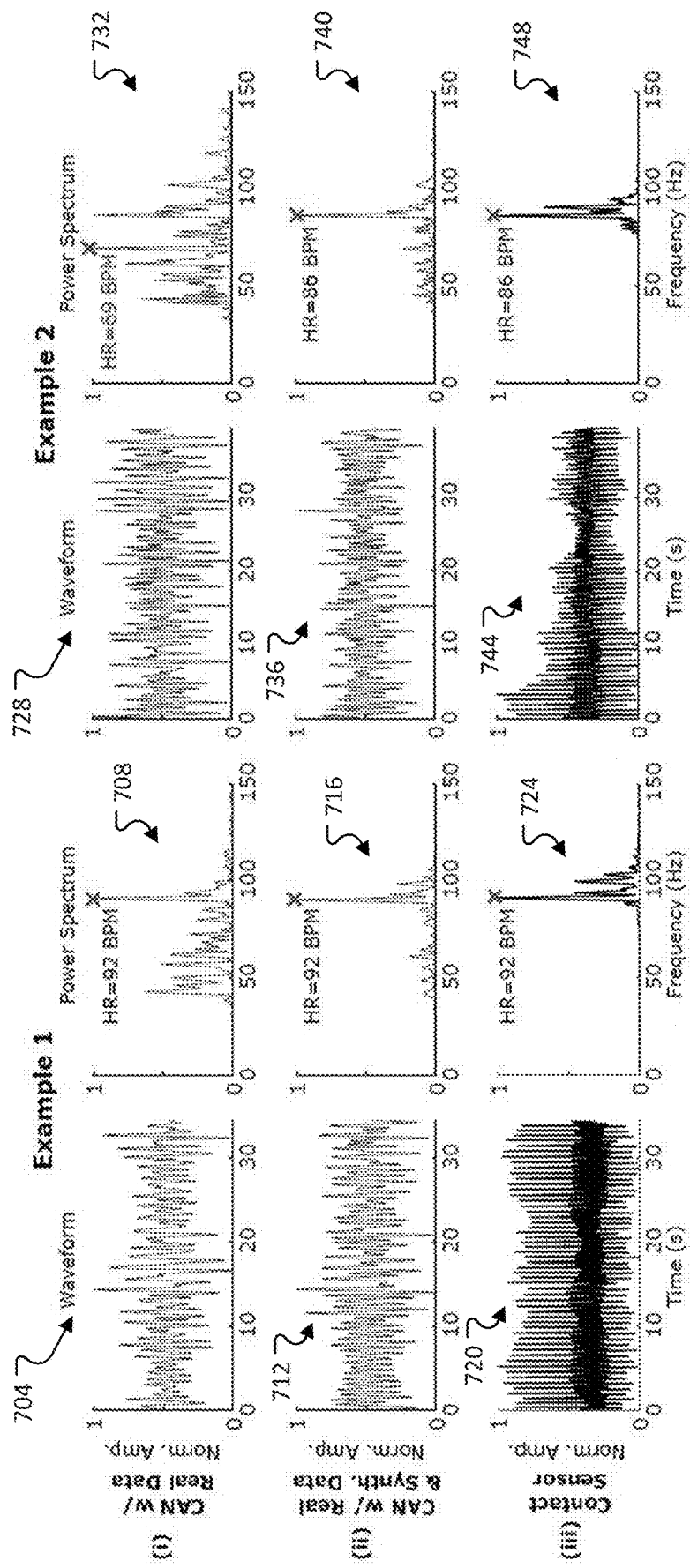
FIG. 7 depicts an example graph including waveforms and power spectrums for isolation or otherwise determining a physiological signal in accordance with examples of the present disclosure.

FIG. 7 depicts examples of a recovered waveform corresponding to a pulse from machine learning model, such as the machine learning model 620 in accordance with examples of the present disclosure. One or more physiological signals may be recovered, for example, from the machine learning model 620 as a recovered physiological signal 632. Example recovered physiological signals may include signals depicted in FIG. 7. That is, a machine learning model, such as the machine learning model 620 may be trained using only real human videos; the machine learning model 620 may recover a waveform, such as the waveform 704, where a power spectrum analyses indicates that a dominant frequency occurs at 92 beats per minute (BPM) as illustrated in graph 708. Such a recovered waveform and pulse generally agree with one or more readings of a contact sensor as depicted by the waveform 720 and resulting pulse show in the graph 724. Further, a machine learning model, such as the machine learning model 620 may be trained using both the physio-realistic avatar videos, such as those depicted as 122 and 124 in FIG. 1, together with real human videos such as those videos depicted in FIG. 1. The machine learning model 620 may recover a waveform, such as the waveform 712, where a power spectrum analyses indicates that a dominant frequency occurs at 92 beats per minute (BPM) as shown by graph 716. Such a recovered waveform and pulse generally agree with one or more readings of a contact sensor as depicted by the waveform 720 and resulting pulse shown in graph 724.

As another example, a machine learning model, such as the machine learning model 620 may be trained using only real human videos; the machine learning model 620 may recover a waveform, such as the waveform 728, where a power spectrum analyses indicates that a dominant frequency occurs at 69 beats per minute (BPM) as illustrated in the graph 732. Such a recovered waveform and pulse do not agree with one or more readings of a contact sensor as depicted by the waveform 736 and resulting pulse shown in the graph 740. Further, a machine learning model, such as the machine learning model 620 may be trained using both the physio-realistic avatar videos, such as those depicted as 122 and 124 in FIG. 1, together with real human videos such as those videos depicted in FIG. 1. The machine learning model 620 may recover a waveform, such as the waveform 736, where a power spectrum analyses indicates that a dominant frequency occurs at 92 beats per minute (BPM) as shown by graph 740. Such a recovered waveform and pulse generally agree with one or more readings of a contact sensor as depicted by the waveform 744 and resulting pulse shown in graph 748. Accordingly, by using real and physio-realistic synthesized videos, the recovered physiological signal may be more accurate or otherwise correspond to better to a non-contact, gold standard, measurement.

Figure 8:
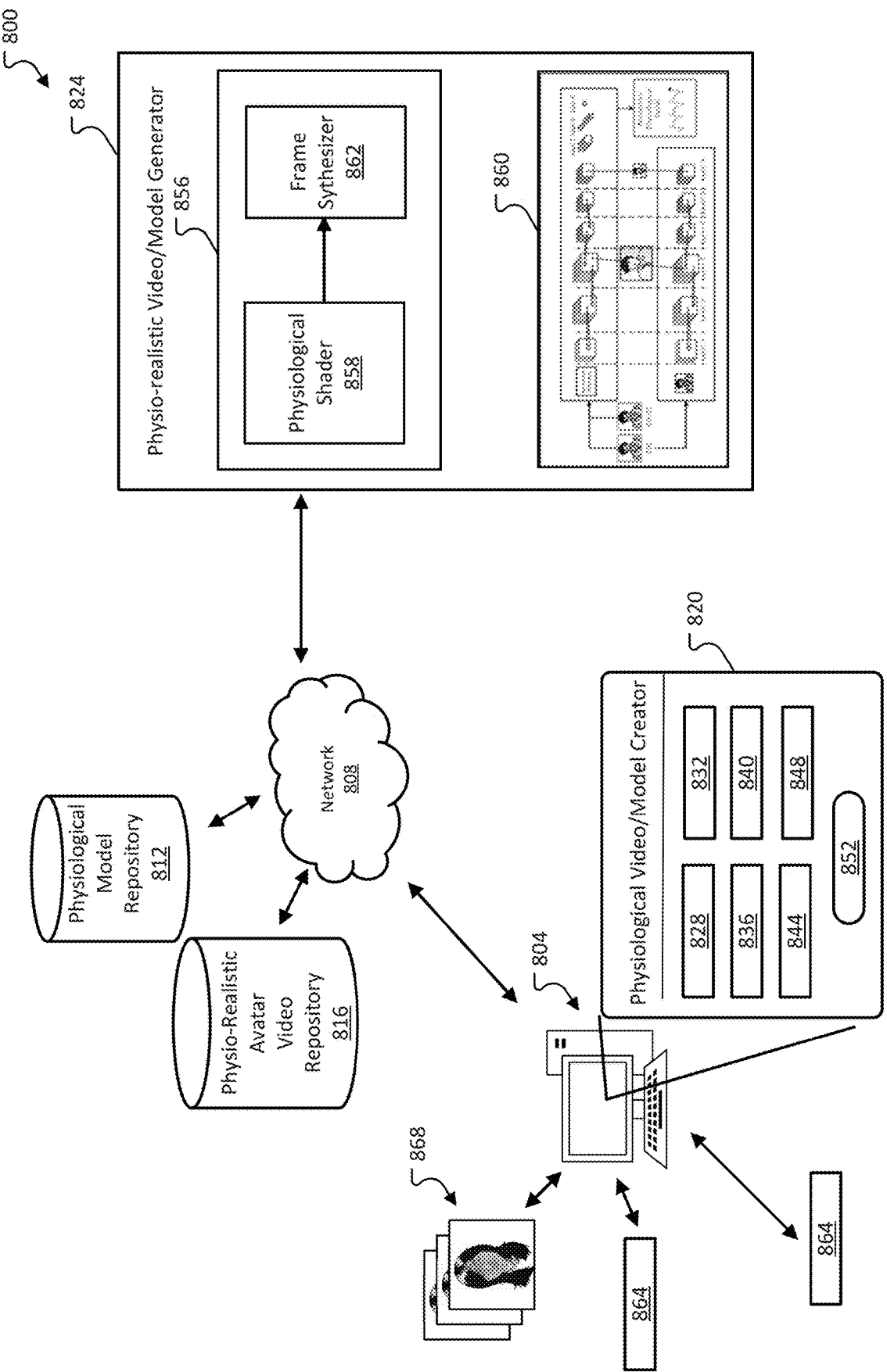
FIG. 8 depicts details of a physio-realistic video and/or model generator in accordance with examples of the present disclosure.

FIG. 8 depicts a system 800 including details of a physio-realistic video generator and/or a generator for a machine learning model trained with synthesized physio-realistic video in accordance with examples of the present disclosure. That is, a device, such as a computing device 804, may interact with a physio-realistic video/model generator 824 to retrieve and/or have generated in real-time or substantially real-time, one or more of a synthesized physio-realistic video sequences and/or a physiological model. For example, a user operating a computing device 804 may desire training data to train their own machine learning model to recover a physiological signal. In some examples, a user operating the computing device 804 may desire to obtain a machine learning model for integration into a physiological measurement system. As another example, a user operating the computing device 804 may desire to have existing physiological data, such as a physiological waveform, anonymized such that an avatar exhibits the physiological characteristic instead of an actual human. In some example, a user operating the computing device 804 may wish to have an avatar exhibiting a physiological characteristic generated for a specific cinematic effect. Accordingly, the user may utilize the physio-realistic video/model generator 824 to obtain such synthesized physio-realistic video sequences and/or models.

The user, via the computing device 804, may browse one or more of the physio-realistic avatar video repositories 816 and/or the physiological model repository 812 for synthesized physio-realistic video sequences and/or models. If, for example, a user is unable to locate a desired synthesized physio-realistic video sequence and/or model, the user may select one or more parameters via a user interface 820. The one or more parameters may include, but are not limited to, appearance parameters 828, an albedo 832, a physio-realistic data signal 836, subsurface skin parameters 840, a background 844, and/or other external parameters 848 as previously described with respect to FIG. 3. The user may submit such parameters using as submit feature or button 852 such that the parameters are provided to the physio-realistic video/model generator 824 via the network 808. The physio-realistic video/model generator 824 may proceed to generate synthesized physio-realistic video sequences in a manner consistent with FIGS. 1-3 utilizing the physiological shader 858 and the frame synthesizer 862 of a physio-realistic video generator 856. In some examples, the physio-realistic video/model generator 824 may proceed to generate one or more physiological models utilizing a machine learning model 860. The physio-realistic video/model generator 824 may then provide the synthesized physio-realistic video sequences and/or the physiological models to either one or more of the repositories 812 or 816 and/or to the user operating the computing device 804 as synthesized physio-realistic video sequences 868 and/or physiological model 872.

In some examples, a user operating the computing device 804 may provide physiological data 864 such that synthesized physio-realistic video sequences based on the physiological data 864 are generated. For example, the physiological data 864 may be obtained using a gold standard, contact and/or non-contact measurement device or sensor, or may be a recovered physiologic signal, such as the recovered physiologic signal 140. The physio-realistic video/model generator 824 may generate synthesized physio-realistic video sequences based on the physiological data 864 and provide the synthesized physio-realistic video sequences 868 to the user via the network 808.

Figure 9:
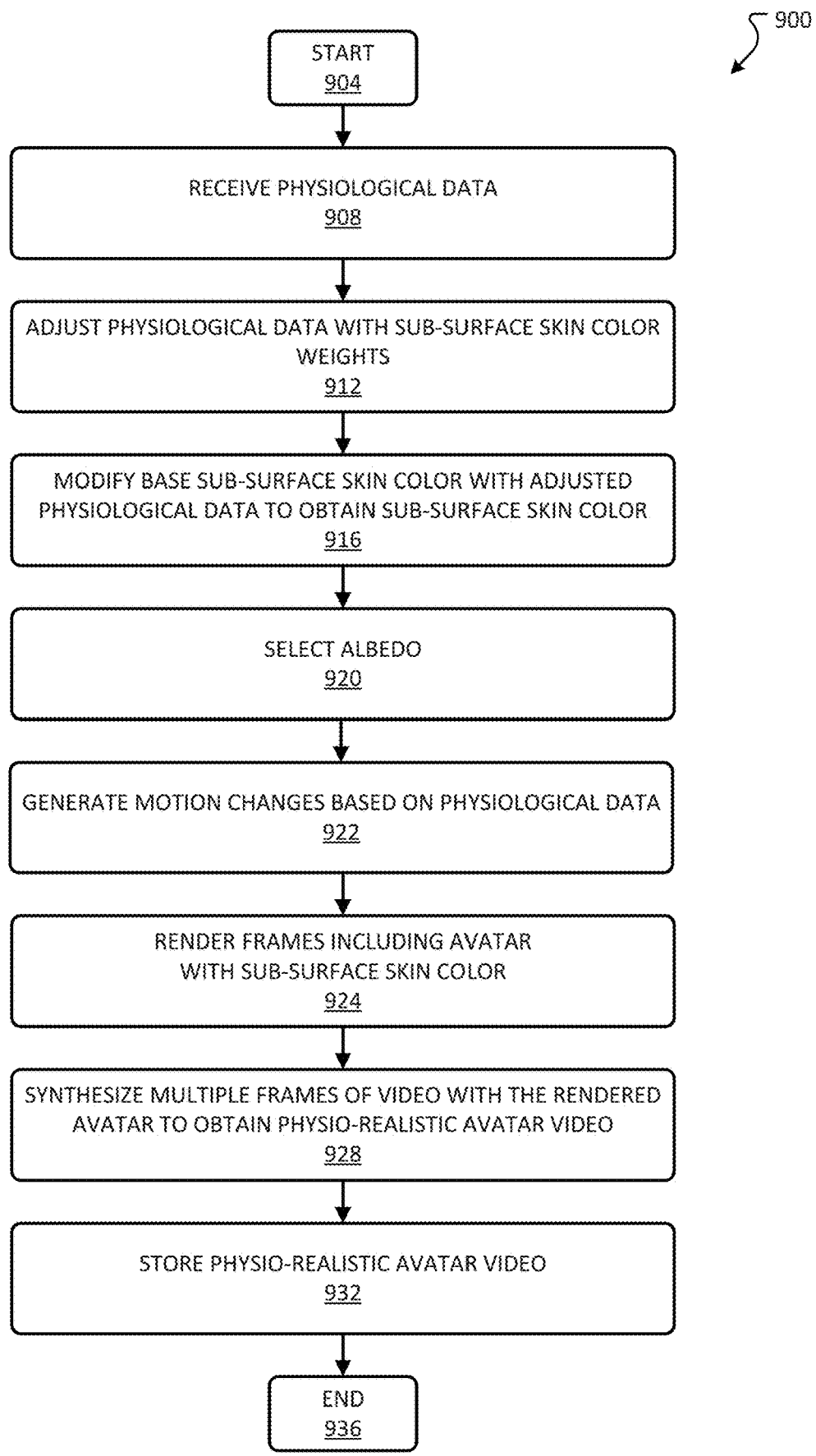
FIG. 9 depicts a method directed to generating a physio-realistic avatar video in accordance with examples of the present disclosure.

FIG. 9 depicts details of a method 900 for generating physio-realistic avatar videos in accordance with examples of the present disclosure. A general order for the steps of the method 900 is shown in FIG. 9. Generally, the method 900 starts at 904 and ends at 932. The method 900 may include more or fewer steps or may arrange the order of the steps differently than those shown in FIG. 9. The method 900 can be executed as a set of computer-executable instructions executed by a computer system and encoded or stored on a computer readable medium. Further, the method 900 can be performed by gates or circuits associated with a processor, Application Specific Integrated Circuit (ASIC), a field programmable gate array (FPGA), a system on chip (SOC), or other hardware device. Hereinafter, the method 900 shall be explained with reference to the systems, components, modules, software, data structures, user interfaces, etc. described in conjunction with FIGS. 1-8.

The method starts at 904, where flow may proceed to 908. At 908, physiological data may be received. The physiological data may include one or more signals indicative of a physiologic response, condition, or signal. For example, the physiological data may correspond to blood volume pulse measurements based on a real human recording, such as a blood volume pulse waveform. As another example, the physiological data may correspond to a respiratory rate/waveform, a heart condition indicated by a waveform or measurement such as atrial fibrillation, and/or oxygen saturation levels. For example, the physiological data may correspond to ballistocardiography (BCG) and may be a ballistocardiographic waveform. As another example, the physiological data may be a photoplethysmographic waveform. In some examples, the physiological data may be utilized to assess one or more conditions, such as but not limited to peripheral arterial disease, the Raynaud's phenomenon and systemic sclerosis, and Takayasu's arteritis. The physiologic data may include other waveforms, measurements, or otherwise and may be from different individuals. In some examples, the waveforms may be recordings of various lengths and various sample rates.

The method 900 may proceed to 912, where the received physiological data is adjusted or otherwise modified by the sub-surface skin color weights. As blood flows through the skin, the composition of the skin changes and causes variations in subsurface color. Accordingly, skin tone changes may be manipulated using the subsurface color parameters including, but not limited to, the base sub-surface skin color, the sub-surface skin color weights, and sub-surface skin scattering parameters. The weights for the sub-surface skin color weights may be derived from the absorption spectrum of hemoglobin and typical frequency bands from example digital cameras. The sub-surface skin color weights may include a weight for one or more color channels and may be applied to the physiological data signal.

The method may proceed to 916, where a base sub-surface skin color forming a base color under the skin may be modified based on the weighted physiological data to obtain a sub-surface skin color. At 920, an albedo may be selected. The albedo may correspond to a texture map transferred from a high-quality 3D face scan. The albedo may be chosen at random or chosen to represent a specific population. The albedo may be devoid of facial hair so that the skin properties can be easily manipulated. Skin type may be randomly selected or selected to represent a specific population. For example, skin type may be selected from one of the six Fitzpatrick skin types. The Fitzpatrick skin type (or phototype) depends on the amount of melanin pigment in the skin. At 922, the method 900 may generate, or otherwise account for, motion changes due at least in part to, the physiological data. In some examples, the physiological processes that are modeled cause both color and motion changes; accordingly, motion weights, such as the motion weights 222, may be applied to the physiological data to account for pixel movement and pixel translation caused, at least in part by, the physiological data. The method 900 may then proceed to 924, where a physio-realistic avatar may be rendered based on the albedo and the sub-surface skin color. In some examples, additional parameters, such as appearance parameters, other sub-surface skin parameters, the motion weights, and external parameters as previously discussed may affect the rendering of the avatar. In some examples, the avatar may be rendered by a physio-realistic shader, such as the physio-realistic shader 308 previously described. As the physiological signal received at 908 may be temporal, multiple images of the avatar, shifted in time, may be rendered.

The method 900 may proceed to 928, where the multiple images of the avatar shifted in time may be synthesized together to form a physio-realistic avatar video of a predetermined length. In some examples, a static or dynamic background may be synthesized together with the rendered avatar. The method 900 may then proceed to 932, where the physio-realistic avatar video may be stored in a physio-realistic avatar video repository, such as the physio-realistic avatar video repository 316 previously described. The physio-realistic avatar video may be tagged or labeled with a training label prior to being stored; alternatively, or in addition, the physio-realistic avatar may be stored in a location or repository associated with a specific training label. An example of a training label includes, but is not limited to blood volume pulse and/or peripheral arterial disease. Accordingly, when using the physio-realistic avatar video to train a machine learning model, the training label may identify one or more characteristics of the video as training and/or test/validation data. The method 900 may then end at 936.

Figure 10:
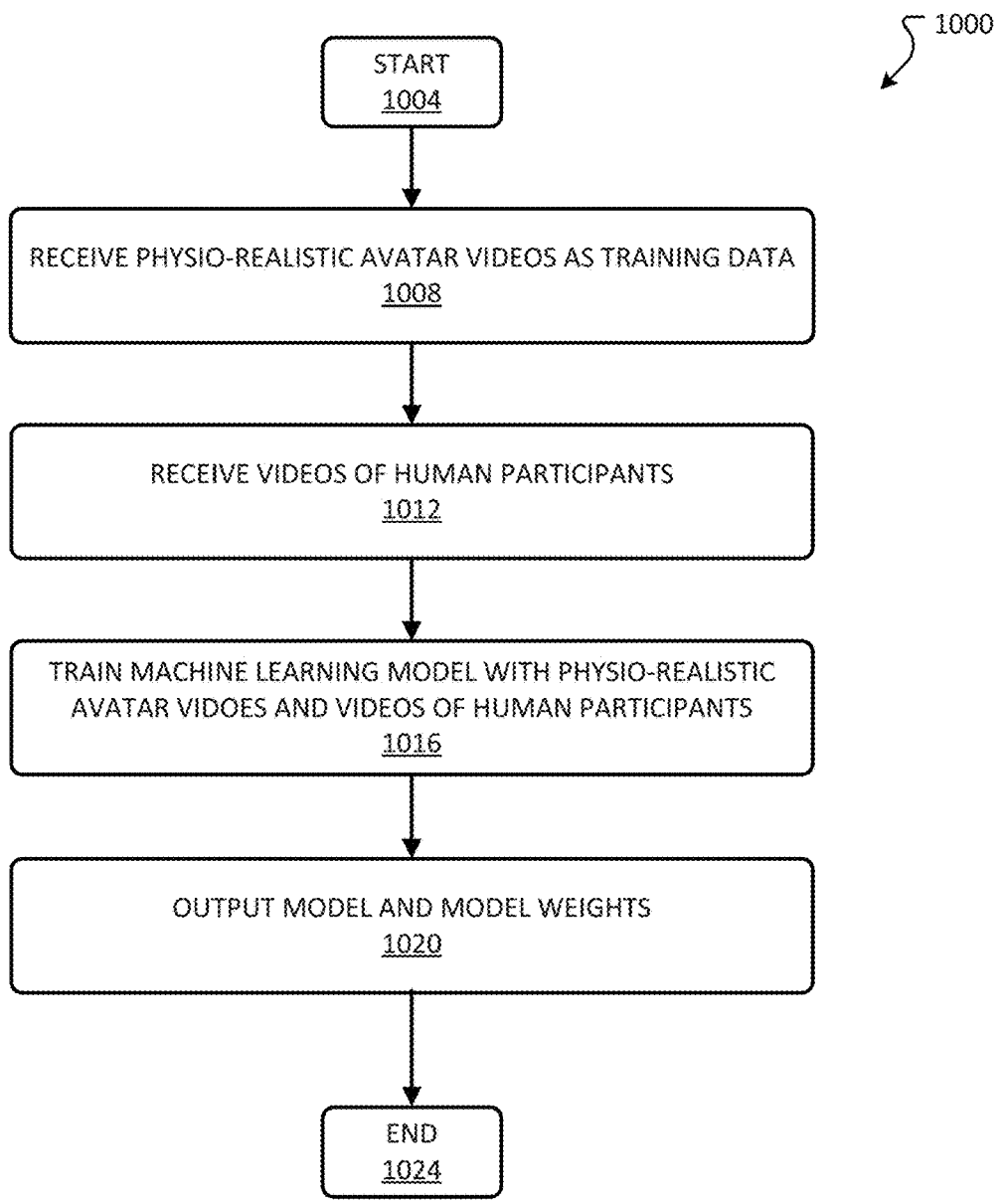
FIG. 10 depicts a method directed to training a machine learning model in accordance with examples of the present disclosure.

FIG. 10 depicts details of a method 1000 for training a machine learning structure in accordance with examples of the present disclosure. A general order for the steps of the method 1000 is shown in FIG. 10. Generally, the method 1000 starts at 1004 and ends at 1020. The method 1000 may include more or fewer steps or may arrange the order of the steps differently than those shown in FIG. 10. The method 1000 can be executed as a set of computer-executable instructions executed by a computer system and encoded or stored on a computer readable medium. Further, the method 1000 can be performed by gates or circuits associated with a processor, Application Specific Integrated Circuit (ASIC), a field programmable gate array (FPGA), a system on chip (SOC), or other hardware device. Hereinafter, the method 1000 shall be explained with reference to the systems, components, modules, software, data structures, user interfaces, etc. described in conjunction with FIGS. 1-9.

The method starts at 1004, where flow may proceed to 1008. At 1008, training data may be received. The training data received at 1008 may include physio-realistic avatar videos; in some examples, the physio-realistic avatar videos may have been synthesized according to the method 1000 previously discussed. At 1012, one or more videos including human participants may be received. That is, a machine learning structure may benefit from utilizing training data including both physio-realistic avatar videos and videos of actual human participants. At 1016, the machine learning structure may be trained with both types of videos.

For example, the machine learning structure may include two paths as discussed with respect to FIG. 4. A first path may be associated with a motion model and a second path associated with an appearance model. The architecture of the motion model may include various layers and hidden units and may include an average pooling and hyperbolic tangent that may be utilized as an activation function. The architecture of the appearance model may be the same as or similar to the motion model. The motion model allows the machine learning structure to differentiate between intensity variations caused by noise, e.g., from motion from subtle characteristic intensity variations induced by the physiological characteristic. The motion representation is computed from the input difference of two consecutive video frames (e.g., C(t) and C(t+1). The appearance model allows the machine learning structure to learn which regions in the image are likely to be reliable for computing strong physiological signals, such as iPPG signals. The appearance model may generate a representation from one or more of the input video frame's texture and color information. The appearance model guides the motion representation to recover iPPG signals from various regions included in the input image, and to further differentiate between them from other sources of noise. The appearance model may take as input a single image or frame of video.

As part of the training process, the recovered physiological signal may be compared to a known, or valid physiological signal. Once a satisfactory accuracy is achieved, the machine learning structure may be output as a machine learning model at 1020, where the structure of the machine learning model may be stored in the model file and the various weights of the machine learning model are stored in a location associated with a weight file. Once the model has been generated, the method 1000 may end at 1024.

Figure 11:
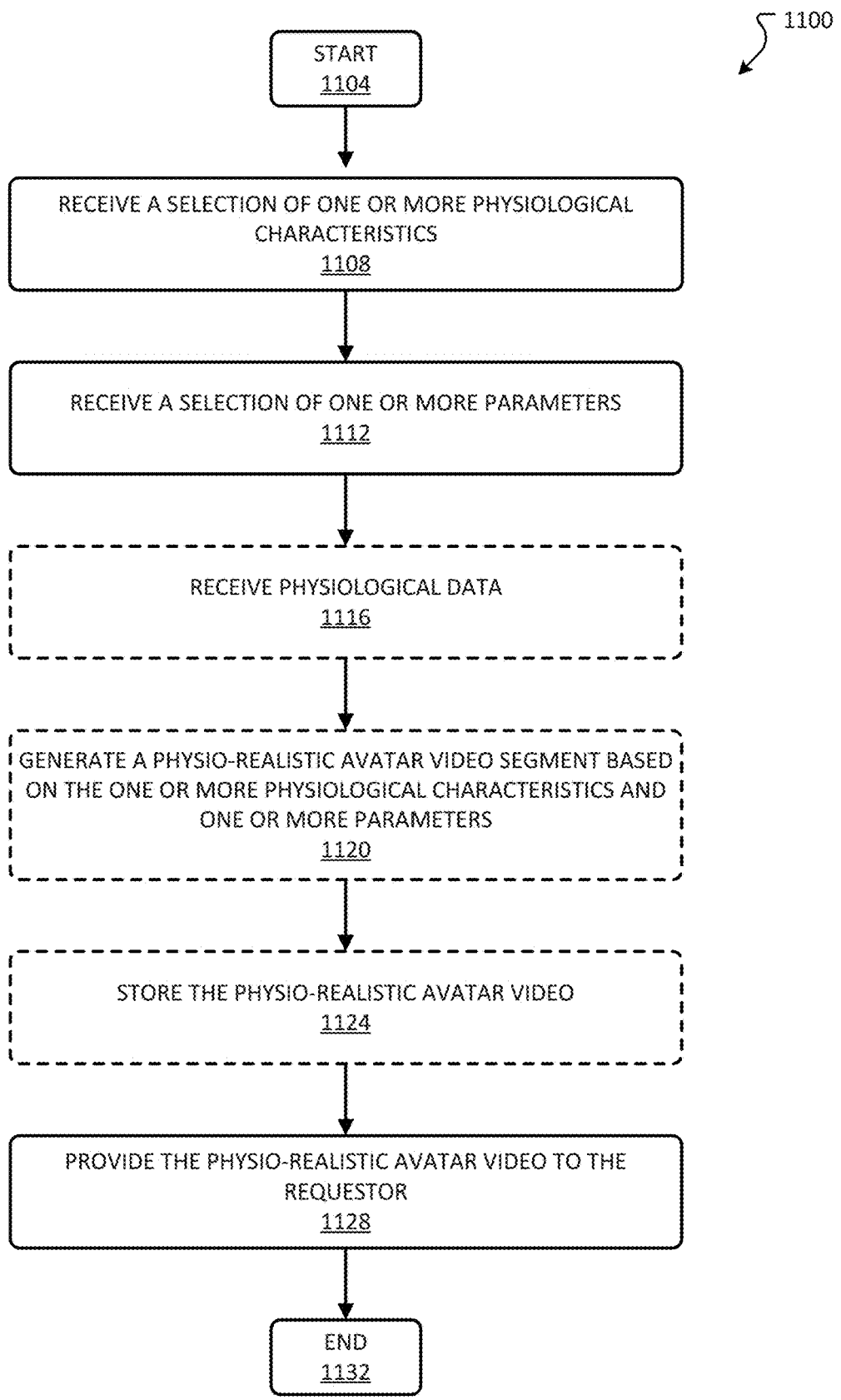
FIG. 11 depicts a method directed to generating and/or locating a physio-realistic avatar video in accordance with examples of the present disclosure.

FIG. 11 depicts details of a method 1100 for identifying and/or generating a physio-realistic avatar video to a requestor in accordance with examples of the present disclosure. A general order for the steps of the method 1100 is shown in FIG. 11. Generally, the method 1100 starts at 1104 and ends at 1132. The method 1100 may include more or fewer steps or may arrange the order of the steps differently than those shown in FIG. 11. The method 1100 can be executed as a set of computer-executable instructions executed by a computer system and encoded or stored on a computer readable medium. Further, the method 1100 can be performed by gates or circuits associated with a processor, Application Specific Integrated Circuit (ASIC), a field programmable gate array (FPGA), a system on chip (SOC), or other hardware device. Hereinafter, the method 1100 shall be explained with reference to the systems, components, modules, software, data structures, user interfaces, etc. described in conjunction with FIGS. 1-10.

The method starts at 1104, where flow may proceed to 1108. At 1108, a selection of one or more physiological characteristics may be received. For example, a user may interact with a user interface, such as the user interface 820, to select physiological characteristics that are to be embodied by a physio-realistic avatar. Such characteristics may include a condition, trait, or signal that the avatar is to exhibit. As another example, the physiological characteristics may be a pulse rate for example or an avatar with atrial fibrillation for example. At 1112, a user may interact with the user interface 820 to selection one or more parameters. For example, the parameters may include but are not limited to appearance parameters 828, an albedo 832, a physio-realistic data signal 836, subsurface skin parameters 840, a background 744, and/or other external parameters 848 as previously described with respect to FIG. 3 and FIG. 8. At 1116, the physiological data may be received. In examples, the physiological data received at 1116 may be received from a physiological data repository. For example, if a user were to desire that the avatar exhibit a pulse rate of 120 beats per minute, physiological data corresponding to the pulse rate may be obtained from a repository. In some examples, a user may upload physiological data at 1116. That is, a user operating a computing device may provide physiological data such that synthesized physio-realistic video sequences are based on the physiological data.

The method 1100 may then move to 1120 where a physio-realistic avatar video segment based on the one or more physiological characteristics and one or more physiological parameters may be generated. That is, the physio-realistic avatar may be generated, or rendered in real-time such that the physiological characteristics, parameters, and physiological data are specific to the rendered avatar. In some examples, the physiological characteristics cause both color and motion changes; accordingly, motion weights, may be applied to the physiological data to account for pixel movement and pixel translation caused, at least in part by, the physiological data. Multiple images of the avatar may be generated such that the images can be synthesized, together with a background, into a physio-realistic avatar video. At 1124, the physio-realistic avatar video may be stored in a physio-realistic avatar video repository, such as the physio-realistic avatar video repository 128. Portions 1116, 1120, and 1124 of the method 1100 may be optional in that rather than generating an physio-realistic avatar video based on one or more characteristics, parameters, and physiological data, an existing physio-realistic avatar video meeting the criteria specified by the user may be located and provided to the requestor. Accordingly, at 1128, the method 1100 may provide the requestor with the requested video, either a real-time video as previously discussed, or a preexisting video. The method 1100 may end at 1132.

Figure 12:
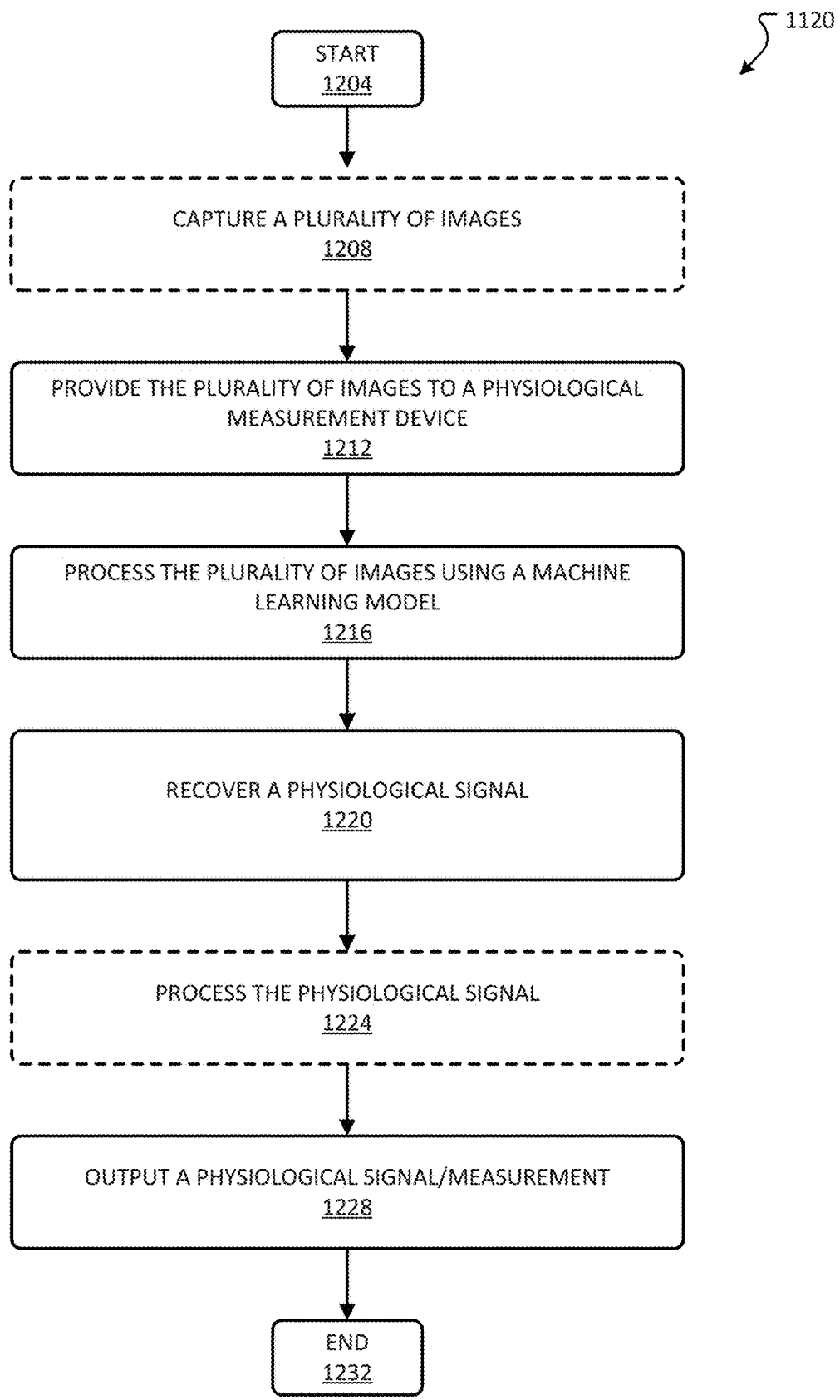
FIG. 12 depicts a method directed to using a trained machine learning model to recover a physiological signal in accordance with examples of the present disclosure.

FIG. 12 depicts details of a method 1200 for recovering a physiological signal from a video using a machine learning model trained on synthetic physio-realistic avatars in accordance with examples of the present disclosure. A general order for the steps of the method 1200 is shown in FIG. 12. Generally, the method 1200 starts at 1204 and ends at 1232. The method 1200 may include more or fewer steps or may arrange the order of the steps differently than those shown in FIG. 12. The method 1200 can be executed as a set of computer-executable instructions executed by a computer system and encoded or stored on a computer readable medium. Further, the method 1200 can be performed by gates or circuits associated with a processor, Application Specific Integrated Circuit (ASIC), a field programmable gate array (FPGA), a system on chip (SOC), or other hardware device. Hereinafter, the method 1200 shall be explained with reference to the systems, components, modules, software, data structures, user interfaces, etc. described in conjunction with FIGS. 1-11.

The method starts at 1204, where flow may proceed to 1208. At 1208, a plurality of images may be received. The plurality of images may correspond to one or more frames of video including a human subject; in some examples, the plurality of images are video segments depicting a human subject. The subject, or patient, may be a real human and may or may not exhibit one or more physiological characteristics. A camera may be used to capture the plurality of images. The plurality of images may be provided to the physiological measurement device at 1212. The physiological measurement device may be a computing device or a service, such as a web service, that receives the plurality of images and obtains or identifies a physiological signal, such as a heart rate. The physiological measurement device may execute a machine learning model to process the plurality of images at 1216. In examples, the machine learning model may utilize the model/structure data to create, or generate, a model structure. The model structure may be the same as or similar to the machine learning structure that was trained with one or more video sequences. For example, the model/structure data, upon being executed, or ran by the physiological measurement device, may generate a model structure that is similar to the machine learning structure of FIG. 4. Model weights data may be utilized to weight one or more portions, or features, of the newly created model structure as determined during the machine learning process. Accordingly, the machine learning model may receive the plurality of images and process the images recover, or identify, a physiological signal at 1220.

Once a physiological signal has been recovered, the physiological measurement device may further process the recovered physiological signal to output, or provide, a physiological measurement or assessment at 1224. The physiological measurement may be a rate, such as a pulse rate for example. In some examples, the physiological assessment may correspond to a measure of similarity to a predicted label, such as a condition. In some examples, the physiological measurement or assessment may be output at 1228 and stored in a repository or provided to the subject or caregivers of the subject.

Figure 13:
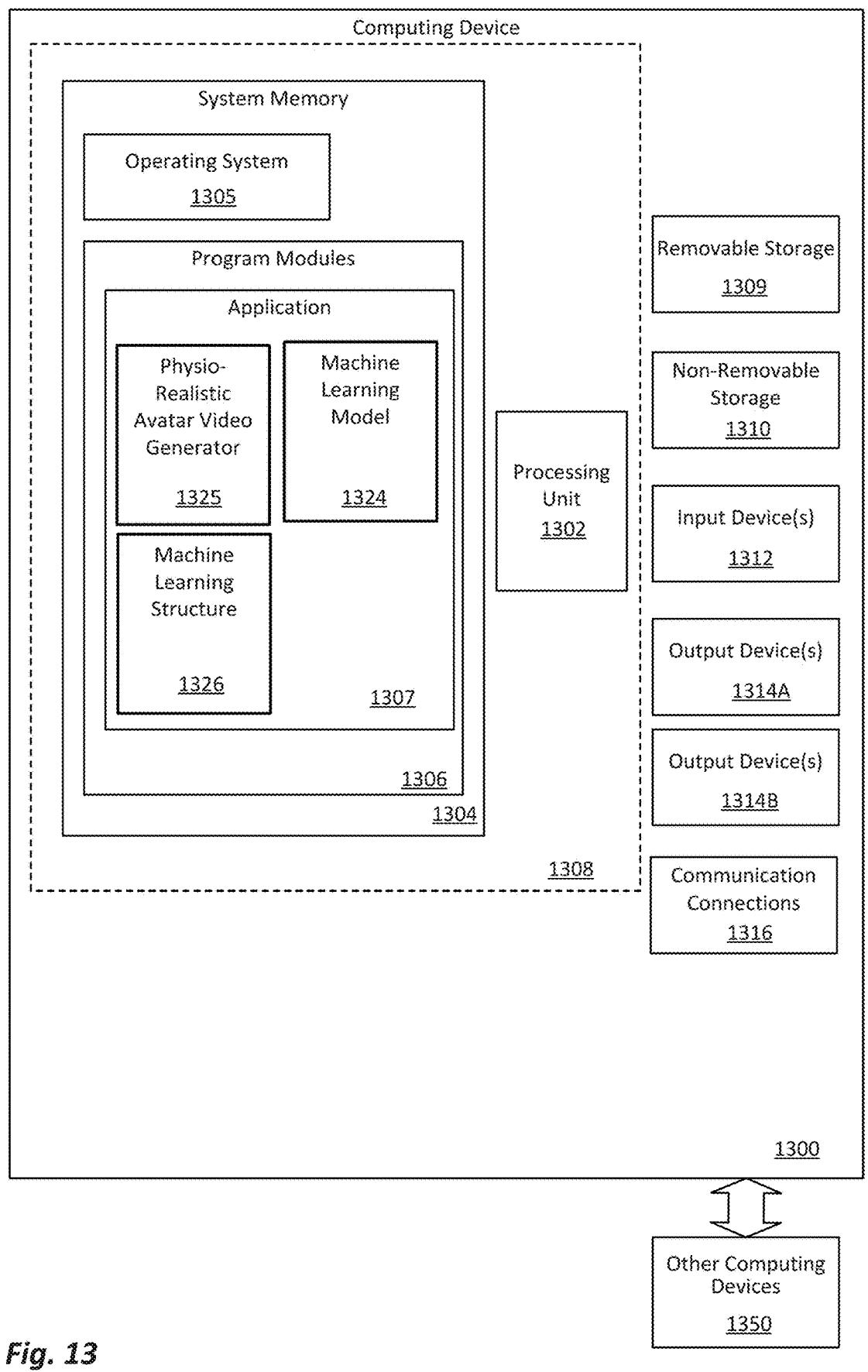
FIG. 13 depicts block diagram illustrating physical components (e.g., hardware) of a computing device with which aspects of the disclosure may be practiced.
Figure 14A:
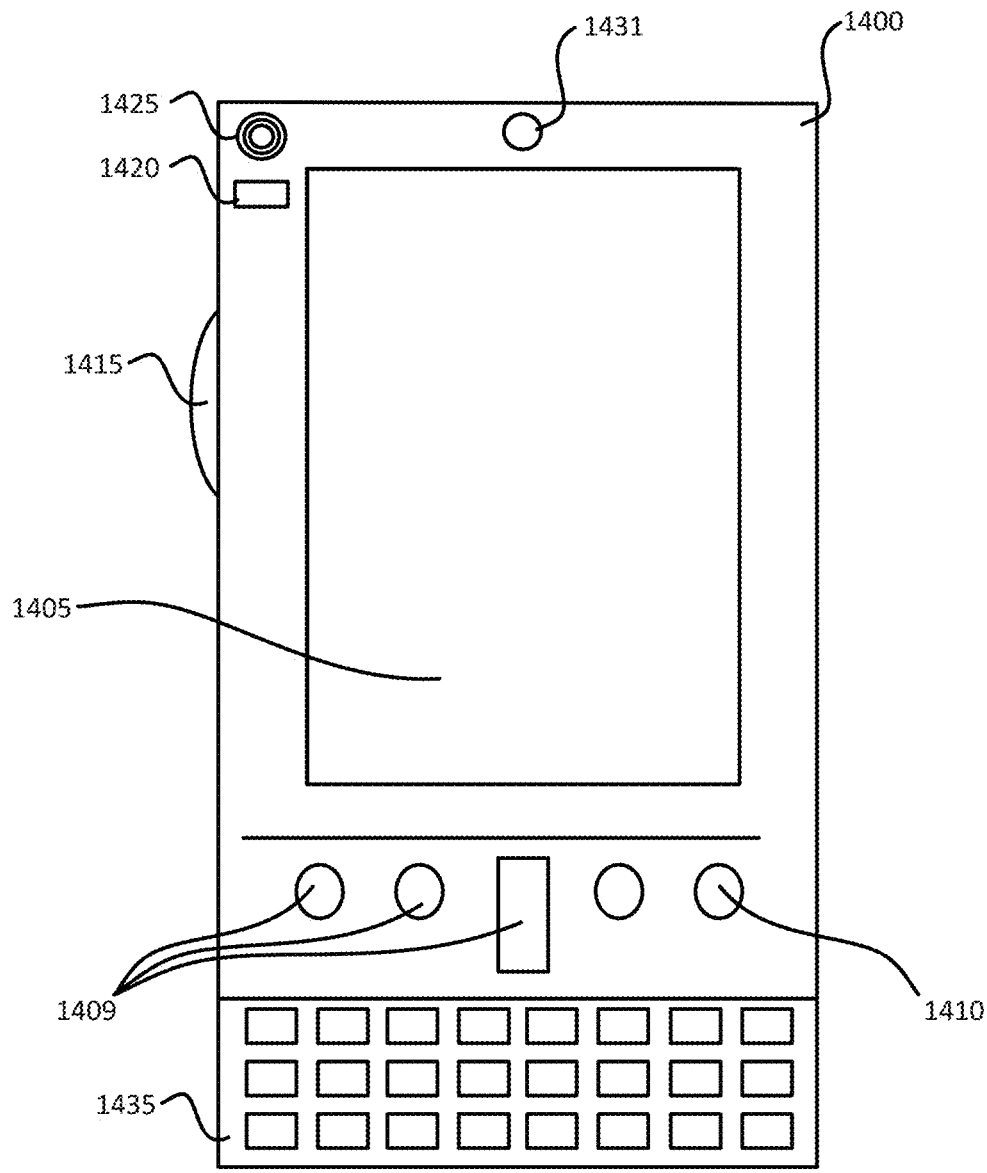
FIG. 14A illustrates a first example of a computing device with which aspects of the disclosure may be practiced.
Figure 14B:
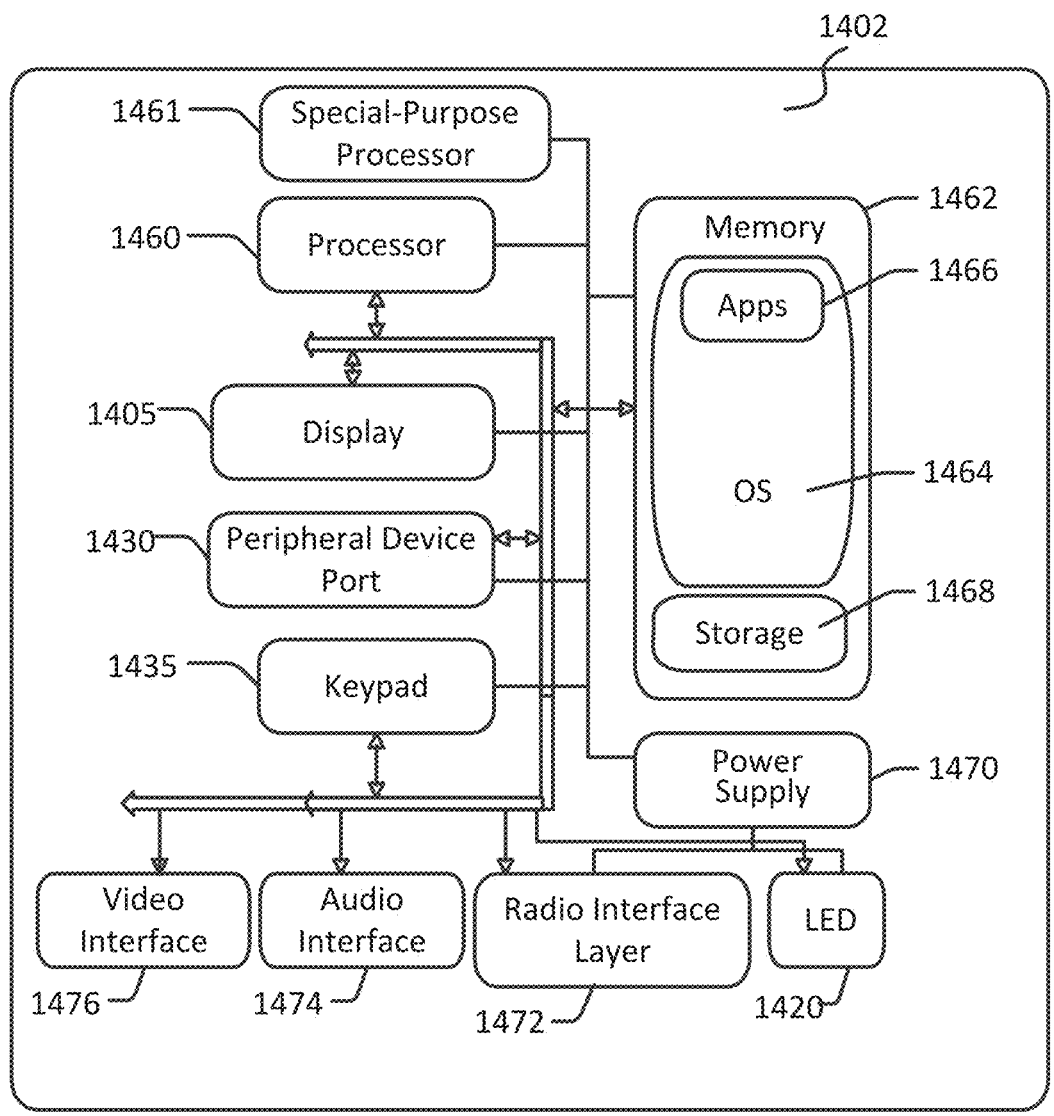
FIG. 14B illustrates a second example of a computing device with which aspects of the disclosure may be practiced.
Figure 15:
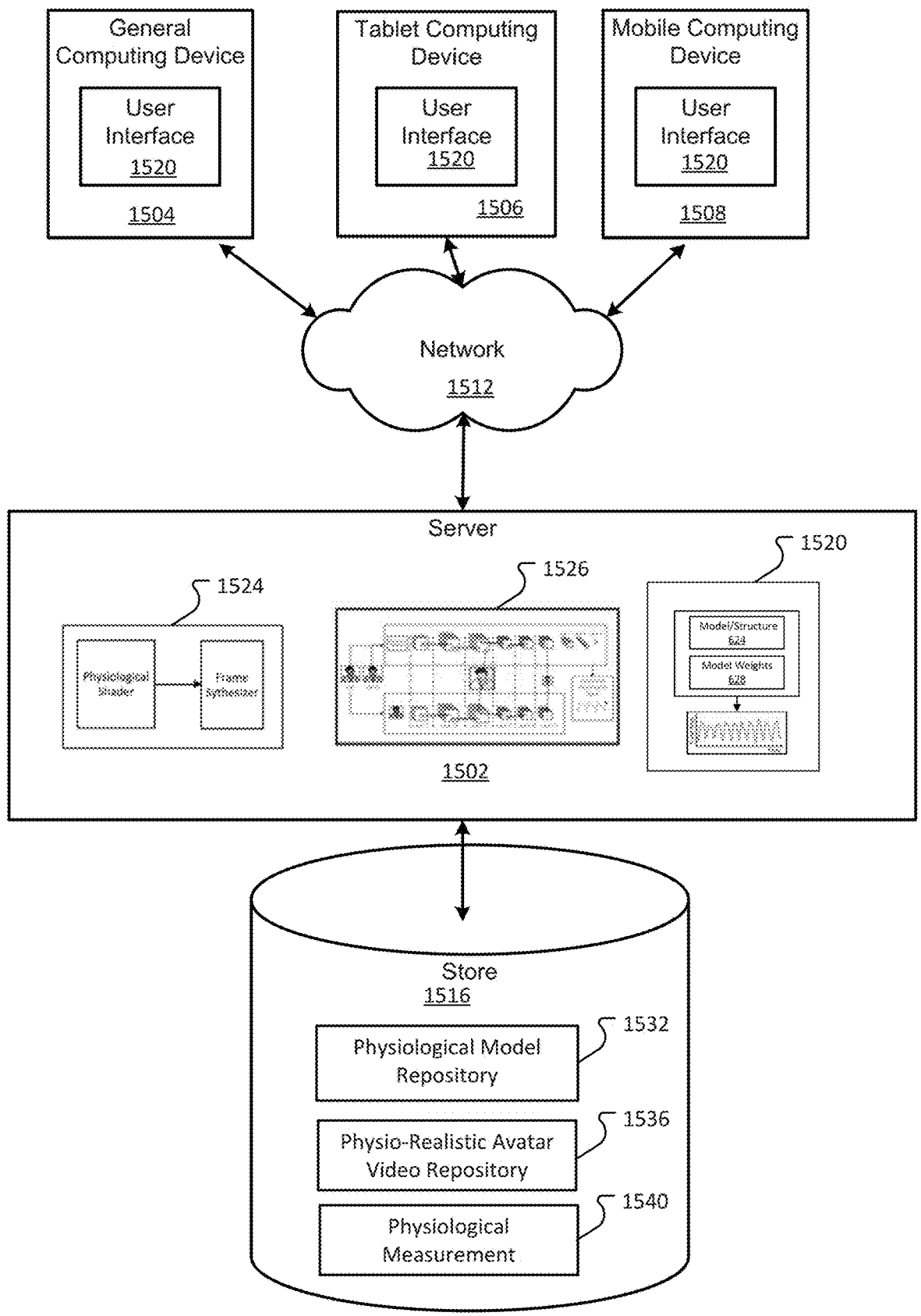
FIG. 15 illustrates at least one aspect of an architecture of a system for processing data in accordance with examples of the present disclosure.

FIGS. 13-15 and the associated descriptions provide a discussion of a variety of operating environments in which aspects of the disclosure may be practiced. However, the devices and systems illustrated and discussed with respect to FIGS. 13-15 are for purposes of example and illustration and are not limiting of a vast number of computing device configurations that may be utilized for practicing aspects of the disclosure, described herein.

FIG. 13 is a block diagram illustrating physical components (e.g., hardware) of a computing device 1300 with which aspects of the disclosure may be practiced. The computing device components described below may be suitable for the computing devices described above. In a basic configuration, the computing device 1300 may include at least one processing unit 1302 and a system memory 1304. Depending on the configuration and type of computing device, the system memory 1304 may comprise, but is not limited to, volatile storage (e.g., random access memory), non-volatile storage (e.g., read-only memory), flash memory, or any combination of such memories.

The system memory 1304 may include an operating system 1305 and one or more program modules 1306 suitable for running software applications 1307, such as but not limited to a machine learning model 1324, a machine learning structure 1326, and a physio-realistic avatar video generator 1325. The machine learning model 1324 may be the same as or similar to the machine learning models 144 and 442 as described with respect to, but not limited to, at least FIGS. 1-12 of the present disclosure. The physio-realistic avatar video generator 1325 may be the same as or similar to the physio-realistic video generator 304 with respect to, but not limited to, at least FIGS. 1-12 of the present disclosure. The machine learning structure 1326 may be the same as or similar to the end-to-end learning model 136 and 404 as described with respect to, but not limited to, at least FIGS. 1-12 of the present disclosure. The operating system 1305, for example, may be suitable for controlling the operation of the computing device 1300.

Furthermore, embodiments of the disclosure may be practiced in conjunction with a graphics library, other operating systems, or any other application program and is not limited to any application or system. This basic configuration is illustrated in FIG. 13 by those components within a dashed line 1308. The computing device 1300 may have additional features or functionality. For example, the computing device 1300 may also include additional data storage devices (removable and/or non-removable) such as, for example, magnetic disks, optical disks, or tape. Such additional storage is illustrated in FIG. 13 by a removable storage device 809 and a non-removable storage device 1310.

As stated above, several program modules and data files may be stored in the system memory 1304. While executing on the at least one processing unit 1302, the program modules 1306 may perform processes including, but not limited to, one or more aspects, as described herein. Other program modules that may be used in accordance with aspects of the present disclosure may include electronic mail and contacts applications, word processing applications, spreadsheet applications, database applications, slide presentation applications, drawing or computer-aided application programs, etc., and/or one or more components supported by the systems described herein.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. For example, embodiments of the disclosure may be practiced via a system-on-a-chip (SOC) where each or many of the components illustrated in FIG. 13 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality, described herein, with respect to the capability of client to switch protocols may be operated via application-specific logic integrated with other components of the computing device 1300 on the single integrated circuit (chip). Embodiments of the disclosure may also be practiced using other technologies capable of performing logical operations such as, for example, AND, OR, and NOT, including but not limited to mechanical, optical, fluidic, and quantum technologies. In addition, embodiments of the disclosure may be practiced within a general-purpose computer or in any other circuits or systems.

The computing device 1300 may also have one or more input device(s) 1312 such as a keyboard, a mouse, a pen, a sound or voice input device, a touch or swipe input device, etc. The output device(s) 1314A such as a display, speakers, a printer, etc. may also be included. An output 1314B, corresponding to a virtual display may also be included. The aforementioned devices are examples and others may be used. The computing device 1300 may include one or more communication connections 1316 allowing communications with other computing devices 1350. Examples of suitable communication connections 1316 include, but are not limited to, radio frequency (RF) transmitter, receiver, and/or transceiver circuitry; universal serial bus (USB), parallel, and/or serial ports.

The term computer readable media as used herein may include computer storage media. Computer storage media may include volatile and nonvolatile, removable and non-removable media implemented in any method or technology for storage of information, such as computer readable instructions, data structures, or program modules. The system memory 1304, the removable storage device 1309, and the non-removable storage device 1310 are all computer storage media examples (e.g., memory storage). Computer storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 1300. Any such computer storage media may be part of the computing device 1300. Computer storage media does not include a carrier wave or other propagated or modulated data signal.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

FIGS. 14A and 14B illustrate a computing device or mobile computing device 1400, for example, a mobile telephone, a smart phone, wearable computer (such as a smart watch), a tablet computer, a laptop computer, and the like, with which aspects of the disclosure may be practiced. With reference to FIG. 14A, one aspect of a mobile computing device 1400 for implementing the aspects is illustrated. In a basic configuration, the mobile computing device 1400 is a handheld computer having both input elements and output elements. The mobile computing device 1400 typically includes a display 1405 and one or more input buttons 1410 that allow the user to enter information into the mobile computing device 1400. The display 1405 of the mobile computing device 1400 may also function as an input device (e.g., a touch screen display). If included, an optional side input element 1415 allows further user input. The side input element 1415 may be a rotary switch, a button, or any other type of manual input element. In alternative aspects, mobile computing device 1400 may incorporate more or less input elements. For example, the display 1405 may not be a touch screen in some aspects. In yet another alternative aspect, the mobile computing device 1400 is a portable phone system, such as a cellular phone. The mobile computing device 1400 may also include an optional keypad 1435. Optional keypad 1435 may be a physical keypad or a "soft" keypad generated on the touch screen display. In various aspects, the output elements include the display 1405 for showing a graphical user interface (GUI), a visual indicator 1431 (e.g., a light emitting diode), and/or an audio transducer 1425 (e.g., a speaker). In some aspects, the mobile computing device 1400 incorporates a vibration transducer for providing the user with tactile feedback. In yet another aspect, the mobile computing device 1400 incorporates input and/or output ports, such as an audio input (e.g., a microphone jack), an audio output (e.g., a headphone jack), and a video output (e.g., a high-definition multimedia interface (HDMI) port) for sending signals to or receiving signals from an external source.

FIG. 14B is a block diagram illustrating the architecture of one aspect of computing device, a server, or a mobile computing device. That is, the mobile computing device 1400 can incorporate a system (1402) (e.g., an architecture) to implement some aspects. The system 1402 can implemented as a "smart phone" capable of running one or more applications (e.g., browser, e-mail, calendaring, contact managers, messaging clients, games, and media clients/players). In some aspects, the system 1402 is integrated as a computing device, such as an integrated personal digital assistant (PDA) and wireless phone.

One or more application programs 1466 may be loaded into the memory 1462 and run on or in association with the operating system 1464. Examples of the application programs include phone dialer programs, e-mail programs, personal information management (PIM) programs, word processing programs, spreadsheet programs, Internet browser programs, messaging programs, and/or one or more components supported by the systems described herein. The system 1402 also includes a non-volatile storage area 1468 within the memory 1462. The non-volatile storage area 1468 may be used to store persistent information that should not be lost if the system 1402 is powered down. The application programs 1466 may use and store information in the non-volatile storage area 1468, such as e-mail or other messages used by an e-mail application, and the like. A synchronization application (not shown) also resides on the system 1402 and is programmed to interact with a corresponding synchronization application resident on a host computer to keep the information stored in the non-volatile storage area 1468 synchronized with corresponding information stored at the host computer. As should be appreciated, other applications may be loaded into the memory 1462 and run on the mobile computing device 1400 described herein (e.g. a machine learning model 1323 and a physio-realistic avatar video generator 1325, etc.).

The system 1402 has a power supply 1470, which may be implemented as one or more batteries. The power supply 1470 might further include an external power source, such as an alternating current (AC) adapter or a powered docking cradle that supplements or recharges the batteries.

The system 1402 may also include a radio interface layer 1472 that performs the function of transmitting and receiving radio frequency communications. The radio interface layer 1472 facilitates wireless connectivity between the system 1402 and the "outside world," via a communications carrier or service provider. Transmissions to and from the radio interface layer 1472 are conducted under control of the operating system 1464. In other words, communications received by the radio interface layer 1472 may be disseminated to the application programs 1466 via the operating system 1464, and vice versa.

The visual indicator 1420 may be used to provide visual notifications, and/or an audio interface 1474 may be used for producing audible notifications via the audio transducer 1425. In the illustrated configuration, the visual indicator 1420 is a light emitting diode (LED) and the audio transducer 1425 is a speaker. These devices may be directly coupled to the power supply 1470 so that when activated, they remain on for a duration dictated by the notification mechanism even though the processor 1460 and other components might shut down for conserving battery power. The LED may be programmed to remain on indefinitely until the user takes action to indicate the powered-on status of the device. The audio interface 1474 is used to provide audible signals to and receive audible signals from the user. For example, in addition to being coupled to the audio transducer 1425, the audio interface 1474 may also be coupled to a microphone to receive audible input, such as to facilitate a telephone conversation. In accordance with aspects of the present disclosure, the microphone may also serve as an audio sensor to facilitate control of notifications, as will be described below. The system 1402 may further include a video interface 1476 that enables an operation of an on-board camera to record still images, video stream, and the like.

A mobile computing device 1400 implementing the system 1402 may have additional features or functionality. For example, the mobile computing device 1400 may also include additional data storage devices (removable and/or non-removable) such as, magnetic disks, optical disks, or tape. Such additional storage is illustrated in FIG. 14B by the non-volatile storage area 1468.

Data/information generated or captured by the mobile computing device 1400 and stored via the system 1402 may be stored locally on the mobile computing device 1400, as described above, or the data may be stored on any number of storage media that may be accessed by the device via the radio interface layer 1472 or via a wired connection between the mobile computing device 1400 and a separate computing device associated with the mobile computing device 1400, for example, a server computer in a distributed computing network, such as the Internet. As should be appreciated such data/information may be accessed via the mobile computing device 1400 via the radio interface layer 1472 or via a distributed computing network. Similarly, such data/information may be readily transferred between computing devices for storage and use according to well-known data/information transfer and storage means, including electronic mail and collaborative data/information sharing systems.

FIG. 15 illustrates one aspect of the architecture of a system for processing data received at a computing system from a remote source, such as a personal computer 1504, tablet computing device 1506, or mobile computing device 1508, as described above. Content displayed at server device 1502 may be stored in different communication channels or other storage types.

In some aspects, one or more of a machine learning structure 1526, the machine learning model 1520, and the physio-realistic avatar video generator 1524, may be employed by server device 1502. The machine learning model 1520 may be the same as or similar to the machine learning models 144 and 442 as described with respect to, but not limited to, at least FIGS. 1-14 of the present disclosure. The physio-realistic avatar video generator 1524 may be the same as or similar to the physio-realistic video generator 304 with respect to, but not limited to, at least FIGS. 1-14 of the present disclosure. The machine learning structure 1526 may be the same as or similar to the end-to-end learning model 136 and 404 as described with respect to, but not limited to, at least FIGS. 1-14 of the present disclosure. The server device 1502 may provide data to and from a client computing device such as a personal computer 1504, a tablet computing device 1506 and/or a mobile computing device 1508 (e.g., a smart phone) through a network 1512. By way of example, the computer system described above may be embodied in a personal computer 1504, a tablet computing device 1506 and/or a mobile computing device 1508 (e.g., a smart phone). Any of these embodiments of the computing devices may obtain content from the store 1516, in addition to receiving graphical data useable to be either pre-processed at a graphic-originating system, or post-processed at a receiving computing system. The content store may include the physiological model repository 1532, the physio-realistic avatar video repository 1536, and/or a physiological measurement 1540.

FIG. 15 illustrates an exemplary mobile computing device 1500 that may execute one or more aspects disclosed herein. In addition, the aspects and functionalities described herein may operate over distributed systems (e.g., cloud-based computing systems), where application functionality, memory, data storage and retrieval and various processing functions may be operated remotely from each other over a distributed computing network, such as the Internet or an intranet. User interfaces and information of various types may be displayed via on-board computing device displays or via remote display units associated with one or more computing devices. For example, user interfaces and information of various types may be displayed and interacted with on a wall surface onto which user interfaces and information of various types are projected. Interaction with the multitude of computing systems with which embodiments of the invention may be practiced include, keystroke entry, touch screen entry, voice or other audio entry, gesture entry where an associated computing device is equipped with detection (e.g., camera) functionality for capturing and interpreting user gestures for controlling the functionality of the computing device, and the like.

The phrases "at least one," "one or more," "or," and "and/or" are open-ended expressions that are both conjunctive and disjunctive in operation. For example, each of the expressions "at least one of A, B and C," "at least one of A, B, or C," "one or more of A, B, and C," "one or more of A, B, or C," "A, B, and/or C," and "A, B, or C" means A alone, B alone, C alone, A and B together, A and C together, B and C together, or A, B and C together.

The term "a" or "an" entity refers to one or more of that entity. As such, the terms "a" (or "an"), "one or more," and "at least one" can be used interchangeably herein. It is also to be noted that the terms "comprising," "including," and "having" can be used interchangeably.

The term "automatic" and variations thereof, as used herein, refers to any process or operation, which is typically continuous or semi-continuous, done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material."

Any of the steps, functions, and operations discussed herein can be performed continuously and automatically.

The exemplary systems and methods of this disclosure have been described in relation to computing devices. However, to avoid unnecessarily obscuring the present disclosure, the preceding description omits several known structures and devices. This omission is not to be construed as a limitation. Specific details are set forth to provide an understanding of the present disclosure. It should, however, be appreciated that the present disclosure may be practiced in a variety of ways beyond the specific detail set forth herein.

Furthermore, while the exemplary aspects illustrated herein show the various components of the system collocated, certain components of the system can be located remotely, at distant portions of a distributed network, such as a local area network (LAN) and/or the Internet, or within a dedicated system. Thus, it should be appreciated, that the components of the system can be combined into one or more devices, such as a server, communication device, or collocated on a particular node of a distributed network, such as an analog and/or digital telecommunications network, a packet-switched network, or a circuit-switched network. It will be appreciated from the preceding description, and for reasons of computational efficiency, that the components of the system can be arranged at any location within a distributed network of components without affecting the operation of the system.

Furthermore, it should be appreciated that the various links connecting the elements can be wired or wireless links, or any combination thereof, or any other known or later developed element(s) that is capable of supplying and/or communicating data to and from the connected elements. These wired or wireless links can also be secure links and may be capable of communicating encrypted information. Transmission media used as links, for example, can be any suitable carrier for electrical signals, including coaxial cables, copper wire, and fiber optics, and may take the form of acoustic or light waves, such as those generated during radio-wave and infrared data communications.

While the flowcharts have been discussed and illustrated in relation to a particular sequence of events, it should be appreciated that changes, additions, and omissions to this sequence can occur without materially affecting the operation of the disclosed configurations and aspects.

Several variations and modifications of the disclosure can be used. It would be possible to provide for some features of the disclosure without providing others.

In yet another configurations, the systems and methods of this disclosure can be implemented in conjunction with a special purpose computer, a programmed microprocessor or microcontroller and peripheral integrated circuit element(s), an ASIC or other integrated circuit, a digital signal processor, a hard-wired electronic or logic circuit such as discrete element circuit, a programmable logic device or gate array such as PLD, PLA, FPGA, PAL, special purpose computer, any comparable means, or the like. In general, any device(s) or means capable of implementing the methodology illustrated herein can be used to implement the various aspects of this disclosure. Exemplary hardware that can be used for the present disclosure includes computers, handheld devices, telephones (e.g., cellular, Internet enabled, digital, analog, hybrids, and others), and other hardware known in the art. Some of these devices include processors (e.g., a single or multiple microprocessors), memory, nonvolatile storage, input devices, and output devices. Furthermore, alternative software implementations including, but not limited to, distributed processing or component/object distributed processing, parallel processing, or virtual machine processing can also be constructed to implement the methods described herein.

In yet another configuration, the disclosed methods may be readily implemented in conjunction with software using object or object-oriented software development environments that provide portable source code that can be used on a variety of computer or workstation platforms. Alternatively, the disclosed system may be implemented partially or fully in hardware using standard logic circuits or very large scale integration (VLSI) design. Whether software or hardware is used to implement the systems in accordance with this disclosure is dependent on the speed and/or efficiency requirements of the system, the particular function, and the particular software or hardware systems or microprocessor or microcomputer systems being utilized.

In yet another configuration, the disclosed methods may be partially implemented in software that can be stored on a storage medium, executed on programmed general-purpose computer with the cooperation of a controller and memory, a special purpose computer, a microprocessor, or the like. In these instances, the systems and methods of this disclosure can be implemented as a program embedded on a personal computer such as an applet, JAVA® or computer-generated imagery (CGI) script, as a resource residing on a server or computer workstation, as a routine embedded in a dedicated measurement system, system component, or the like. The system can also be implemented by physically incorporating the system and/or method into a software and/or hardware system.

The disclosure is not limited to standards and protocols if described. Other similar standards and protocols not mentioned herein are in existence and are included in the present disclosure. Moreover, the standards and protocols mentioned herein, and other similar standards and protocols not mentioned herein are periodically superseded by faster or more effective equivalents having essentially the same functions. Such replacement standards and protocols having the same functions are considered equivalents included in the present disclosure.

In accordance with at least one example of the present disclosure, a method for generating video sequences including physio-realistic avatars is provided. The method may include receiving an albedo for an avatar, modifying a sub-surface skin color associated with the albedo based on physiological data associated with physiologic characteristic, rendering an avatar based on the albedo and the modified sub-surface skin color, and synthesizing a frame of video, the frame of video including the avatar.

In accordance with at least one aspect of the above method, the physiological data varies with time and the method further includes modifying the sub-surface skin color associated with the albedo based on the physiological data at a first time, rendering the avatar based on the albedo and the modified sub-surface skin color associated with the physiological data at the first time, synthesizing a first frame of video, the first frame of video including the avatar rendered based on the albedo and the modified sub-surface skin color associated with the physiological data at the first time, modifying the sub-surface skin color associated with the albedo based on the physiological data at a second time, rendering the avatar based on the albedo and the modified sub-surface skin color associated with the physiological data at the second time, and synthesizing a second frame of video, the second frame of video including the avatar rendered based on the albedo and the modified sub-surface skin color associated with the physiological data at the second time. In accordance with at least one aspect of the above method, the method includes modifying a plurality of color channels with weighting factors specific to the physiological data, modifying the sub-surface skin associated with the albedo with the plurality of color channels. In accordance with at least one aspect of the above method, the method includes varying a sub-surface radii for one or more of the plurality of color channels based on the weighting factors specific to the physiological data. In accordance with at least one aspect of the above method, the method includes training a machine learning model with a plurality of synthesized frames of that include the avatar. In accordance with at least one aspect of the above method, the method includes training the machine learning model with a plurality of videos including human subjects. In accordance with at least one aspect of the above method, the method includes receiving a plurality of video frames depicting a human subject, and recovering a physiological signal based on the trained machine learning model. In accordance with at least one aspect of the above method, the frame of video includes the avatar in front of a dynamic background. In accordance with at least one aspect of the above method, the method includes receiving the physiological data from a requesting entity, synthesizing the frame of video including the avatar substantially in real-time, and providing the frame of video to the requesting entity. In accordance with at least one aspect of the above method, the physiological characteristic is blood volume pulse. In accordance with at least one aspect of the above method, the method includes labeling a video segment including the synthesized frame of video with a training label specific to the physiologic characteristic.

In accordance with at least one example of the present disclosure, a system for training a machine learning model using video sequences including physio-realistic avatars is provided. The system may include a processor, and memory storing instructions, which when executed by the processor, cause the processor to receive a request from a requesting entity to train a machine learning model to detect a physiological characteristic, receive a plurality of video segments, wherein one or more of the video segments includes a synthetic physio-realistic avatar generated with the physiological characteristic, train the machine learning model with the plurality of video segments, and provide a trained model to the requesting entity.

In accordance with at least one aspect of the above system, the instructions, which when executed by the processor, cause the processor to receive a second plurality of video segments, wherein one or more video segments included in the second plurality of video segments depicts a human with the physiological characteristic, and train the machine learning model with the plurality of video segments and the second plurality of video segments. In accordance with at least one aspect of the above system, the physiological characteristic is a blood volume pulse. In accordance with at least one aspect of the above system, the one or more of the plurality of video segments are labeled with a training label based on the physiological characteristic. In accordance with at least one aspect of the above system, the instructions, which when executed by the processor, cause the processor to receive a second video segment, identify a physiological characteristic from the second video segment using the trained model, and provide an assessment of the physiological characteristic to the requesting entity.

In accordance with at least one example of the present disclosure, a computer-readable media is provided. The computer-readable media includes instructions, which when executed by a processor, cause the processor to receive a request to recover a physiological characteristic from a video segment, obtain a machine learning model trained with training data that includes physio-realistic avatars generated with the physiological characteristic, receive a video segment, identify a measure associated with the physiological characteristic from the video segment using the trained machine learning model, and provide an assessment of the physiological characteristic to the requesting entity based on the measure.

In accordance with at least one example of the above computer-readable media, the instructions, which when executed by the processor, cause the processor to receive an albedo for an avatar, modify a sub-surface skin color associated with the albedo based on physiological data associated with the physiologic characteristic, render an avatar based on the albedo and the modified sub-surface skin color, synthesize a frame of video, the frame of video including the avatar, and train the machine learning model with the synthesized frame of video. In accordance with at least one example of the above computer-readable media, the assessment of the physiological characteristic is a pulse rate. In accordance with at least one example of the above computer-readable media, the received video segment depicts a human subject.

At least one aspect of the above system may include where the instructions cause the processor to utilize a tree-based classifier to identify the covariates impacting the quality metric based on features included in the first telemetry data and the second telemetry data. At least one aspect of the above system may include where the instructions cause the processor to stratify the first and second group of devices using a subset of the identified covariates that are greater than a threshold. At least one aspect of the above system may include where the instructions cause the processor to provide the quality metric to a display device in proximity to the predicted quality metric.

The present disclosure, in various configurations and aspects, includes components, methods, processes, systems and/or apparatus substantially as depicted and described herein, including various combinations, subcombinations, and subsets thereof. Those of skill in the art will understand how to make and use the systems and methods disclosed herein after understanding the present disclosure. The present disclosure, in various configurations and aspects, includes providing devices and processes in the absence of items not depicted and/or described herein or in various configurations or aspects hereof, including in the absence of such items as may have been used in previous devices or processes, e.g., for improving performance, achieving ease, and/or reducing cost of implementation.

The invention claimed is:

1. A method for generating video sequences including physio-realistic avatars, the method comprising:
    receiving an albedo for an avatar;
    modifying a sub-surface skin color associated with the skin pixels of the albedo based on a sub-surface skin color weight applied to physiological data, wherein the sub-surface skin color weight is based on an absorption spectrum associated with the physiological data for one or more color channels;
    generating physio-realistic avatar video of the avatar by rendering the avatar based on the albedo and the modified sub-surface skin color;
    generating, based on the generated physio-realistic avatar video, a machine learning structure, wherein the machine learning structure comprises a first model and a second model, the first model predicts a motion representation of the avatar, and the second model predicts a region in a frame of the generated physio-realistic avatar video for computing a physiological signal; and
    storing the generated machine learning structure and one or more weights of the generated machine learning structure, wherein the one or more weights of the generated machine learning structure represent one or more model weights of a trained machine learning model.

2. The method of claim 1, wherein the physiological data varies with time, the method further comprising:
    modifying the sub-surface skin color associated with the albedo based on the physiological data at a first time;
    rendering the avatar based on the albedo and the modified sub-surface skin color associated with the physiological data at the first time;
    synthesizing a first frame of video, the first frame of video including the avatar rendered based on the albedo and the modified sub-surface skin color associated with the physiological data at the first time;

modifying the sub-surface skin color associated with the albedo based on the physiological data at a second time;

rendering the avatar based on the albedo and the modified sub-surface skin color associated with the physiological data at the second time; and synthesizing a second frame of video, the second frame of video including the avatar rendered based on the albedo and the modified sub-surface skin color associated with the physiological data at the second time.

3. The method of claim 1, further comprising:

modifying the physiological data with weighting factors specific to the physiological data; and modifying the sub-surface skin color associated with the albedo with the modified physiological data.

4. The method of claim 3, further comprising varying sub-surface radii for one or more of the plurality of color channels based on the weighting factors specific to the physiological data.

5. The method of claim 1, further comprising training a machine learning model with a plurality of synthesized frames of that include the avatar.

6. The method of claim 5, further comprising training the machine learning model with a plurality of videos including human subjects.

7. The method of claim 6, further comprising:

receiving a plurality of video frames depicting a human subject; and recovering a physiological signal based on the trained machine learning model.

8. The method of claim 1, further comprising:

synthesizing a frame of video, the frame of video including the avatar, wherein the frame of video includes the avatar in front of a dynamic background.

9. The method of claim 1, further comprising:

receiving the physiological data from a requesting entity;

synthesizing a frame of video including the avatar substantially in real-time; and providing the frame of video to the requesting entity.

10. The method of claim 1, wherein the physiological data indicate a blood volume pulse as a physiological characteristic.

11. The method of claim 1, further comprising:

synthesizing a frame of video, the frame of video including the avatar; and labeling a video segment including the synthesized frame of video with a training label specific to a physiological characteristic according to the physiological data.

12. A system for training a machine learning model using video sequences including physio-realistic avatars, the system comprising:

a processor; and memory storing instructions, which when executed by the processor, cause the processor to:

receive an albedo for an avatar;

modifying a sub-surface skin color associated with the skin pixels of the albedo based on a sub-surface skin color weight applied to physiological data, wherein the sub-surface skin color weight is based on an absorption spectrum associated with the physiological data for one or more color channels;

generating a physio-realistic avatar by rendering the avatar based on the albedo and the modified sub-surface skin color;

generating, based on the generated physio-realistic avatar video, a machine learning structure, wherein the machine learning structure comprises a first model and a second model, the first model predicts a motion representation of the avatar, and the second model predicts a region in a frame of the generated physio-realistic avatar video for computing a physiological signal; and storing the generated machine learning structure and one or more weights of the generated machine learning structure, wherein the one or more weights of the generated machine learning structure represent one or more model weights of a trained machine learning model.

13. The system of claim 12, further comprising instructions, which when executed by the processor, cause the processor to:

receive a second plurality of video segments, wherein one or more video segments included in the second plurality of video segments depicts a human with a physiological characteristic according to the physiological data; and train the machine learning model with the plurality of video segments and the second plurality of video segments.

14. The system of claim 12, wherein the physiological data indicate a blood volume pulse as a physiological characteristic.

15. The system of claim 12, wherein one or more of the plurality of video segments are labeled with a training label based on the physiological characteristic.

16. The system of claim 12, further comprising instructions, which when executed by the processor, cause the processor to:

receive a second video segment;

identify a physiological characteristic of the second video segment using the trained model; and provide an assessment of the physiological characteristic of the second video to the requesting entity.

17. A non-transitory computer storage media including instructions, which when executed by a processor, cause the processor to:

receiving an albedo for an avatar;

modifying a sub-surface skin color associated with the skin pixels of the albedo based on a sub-surface skin color weight applied to physiological data, wherein the sub-surface skin color weight is based on an absorption spectrum associated with the physiological data for one or more color channels;

generating physio-realistic avatar video of the avatar by rendering the avatar based on the albedo and the modified sub-surface skin color;

receive a request to recover a physiological characteristic from the physio-realistic avatar video;

generating, based on the generated physio-realistic avatar video, a machine learning structure, wherein the machine learning structure comprises a first model and a second model, the first model predicts a motion representation of the avatar, and the second model predicts a region in a frame of the generated physio-realistic avatar video for computing a physiological signal;

obtain a trained machine learning model comprising the machine learning structure;

receive a video segment;

identify a measure associated with a physiological characteristic from the video segment using the trained machine learning model; and provide an assessment of the physiological characteristic of the physiological characteristic from the video segment to the requesting entity based on the measure.

18. The non-transitory computer storage media of claim 17, wherein the instructions, which when executed by the processor, cause the processor to:
train a machine learning model with the generated physio-realistic avatar video.

19. The non-transitory computer storage media of claim 17, wherein the assessment of the physiological characteristic is a pulse rate.

20. The non-transitory computer storage media of claim 17, wherein the received video segment depicts a human subject.

* * * * *